(12) United States Patent
Matsuzaki et al.

(10) Patent No.: US 11,813,999 B2
(45) Date of Patent: Nov. 14, 2023

(54) OCCUPANT PROTECTION DEVICE

(71) Applicant: TOYODA GOSEI CO., LTD., Kiyosu (JP)

(72) Inventors: Yuji Matsuzaki, Kiyosu (JP); Akira Yasuda, Kiyosu (JP); Yuto Noda, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/891,496

(22) Filed: Aug. 19, 2022

(65) Prior Publication Data

US 2023/0103417 A1     Apr. 6, 2023

(30) Foreign Application Priority Data

Sep. 29, 2021   (JP) .................... 2021-159078

(51) Int. Cl.
| | |
|---|---|
| *B60R 21/18* | (2006.01) |
| *B60R 21/231* | (2011.01) |
| *B60R 21/237* | (2006.01) |
| *B60R 21/26* | (2011.01) |

(52) U.S. Cl.
CPC ............ *B60R 21/18* (2013.01); *B60R 21/231* (2013.01); *B60R 21/237* (2013.01); *B60R 21/26* (2013.01); *B60R 2021/26094* (2013.01)

(58) Field of Classification Search
CPC .......... B60R 21/18; B60R 2021/26094; B60R 21/26; B60R 2021/2685; B60R 2021/23107; B60R 21/233; B60R 2021/23308; B60R 2021/233324; B60R 2021/23382; B60R 21/237; B60R 21/231; B60R 21/239; B60R 2021/23384
USPC ........................................................ 280/733
See application file for complete search history.

(56) References Cited

U.S. PATENT DOCUMENTS

| | | | | |
|---|---|---|---|---|
| 5,240,282 | A | * | 8/1993 | Wehner ............... B60R 21/2338 |
| | | | | 280/743.1 |
| 9,517,744 | B2 | * | 12/2016 | Shimazu ................ B60R 21/18 |
| 9,533,652 | B1 | * | 1/2017 | Paxton .................. B60R 21/239 |
| 10,611,331 | B2 | * | 4/2020 | Jang ..................... B60R 21/2338 |

(Continued)

FOREIGN PATENT DOCUMENTS

| | | |
|---|---|---|
| JP | 2015-51744 A | 3/2015 |
| JP | 2018172013 A | 11/2018 |

*Primary Examiner* — Paul N Dickson
*Assistant Examiner* — Matthew Joseph Ganci
(74) *Attorney, Agent, or Firm* — POSZ LAW GROUP, PLC

(57) ABSTRACT

An occupant protection device is such that an airbag is housed in a housing region of a lap belt portion that can be disposed on a front side of a waist portion of an occupant seated in a seat. The airbag can receive and protect an upper body of the occupant using a rear face side occupant restraining face when inflation is completed. The airbag includes an exhaust port that can discharge an inflating gas and a regulating valve mechanism that restricts a discharge of the inflating gas from the exhaust port. The regulating valve mechanism permits a discharge of the inflating gas from the exhaust port when a protrusion upward of the airbag from the housing portion is restricted, and restricts a discharge of the inflating gas from the exhaust port when a protrusion upward of the airbag from the housing portion is not restricted.

6 Claims, 17 Drawing Sheets

(56) References Cited

U.S. PATENT DOCUMENTS

| | | | | |
|---|---|---|---|---|
| 10,647,286 | B1* | 5/2020 | Dennis | B60R 21/232 |
| 11,186,247 | B2* | 11/2021 | Komura | B60R 21/2346 |
| 2015/0069741 | A1 | 3/2015 | Shimazu | |
| 2019/0315470 | A1* | 10/2019 | Humbert | B64D 11/0621 |
| 2020/0122668 | A1* | 4/2020 | Ozaki | B60R 21/231 |
| 2020/0290545 | A1* | 9/2020 | Walker | B60R 21/18 |
| 2021/0094504 | A1* | 4/2021 | Tanaka | B60R 21/2338 |
| 2021/0129785 | A1* | 5/2021 | Fischer | B60R 21/2338 |
| 2021/0146879 | A1* | 5/2021 | Akoma | B60R 22/14 |

* cited by examiner

FIG. 3
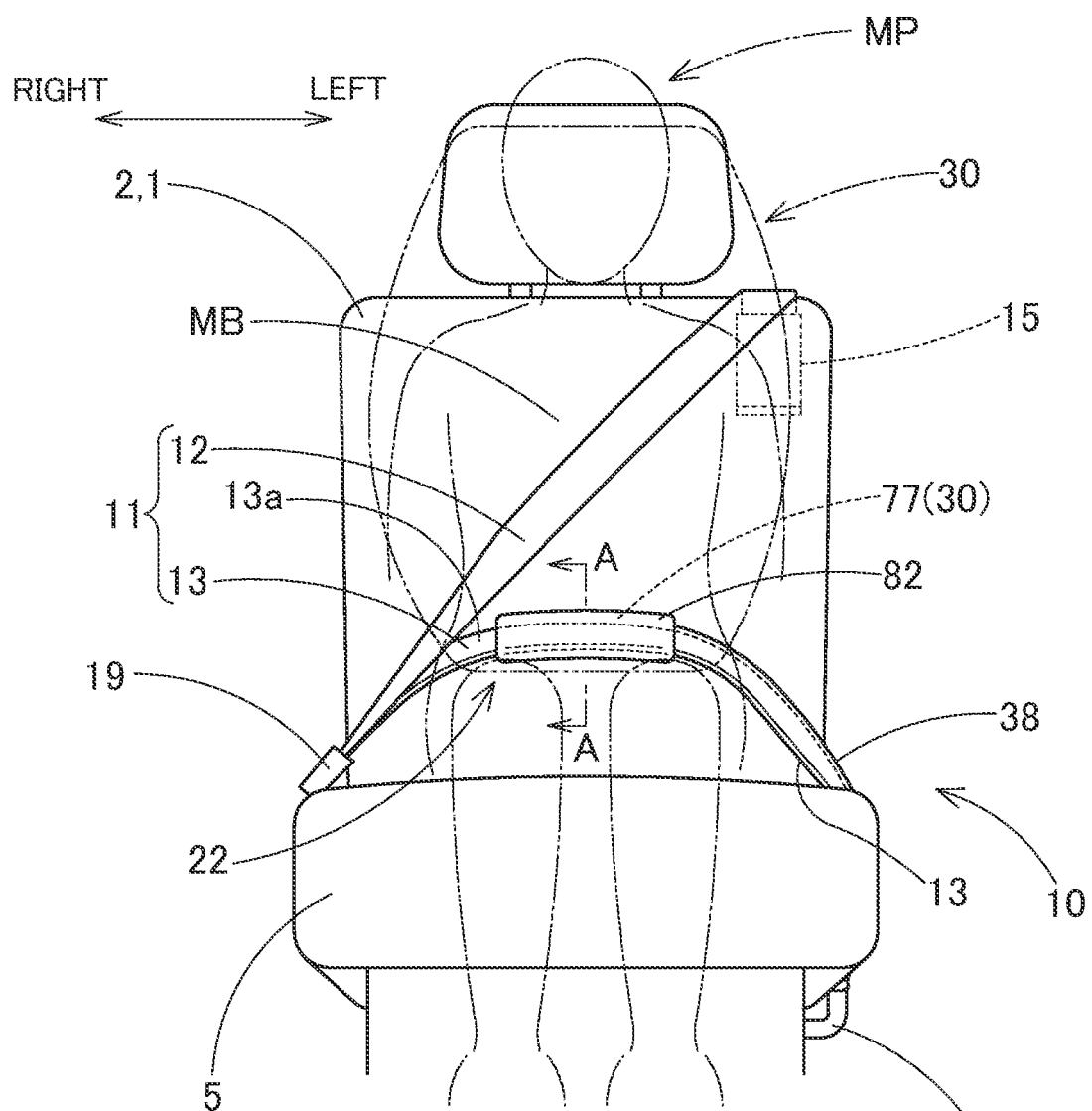
A—A PORTION SCHEMATIC CROSS-SECTION
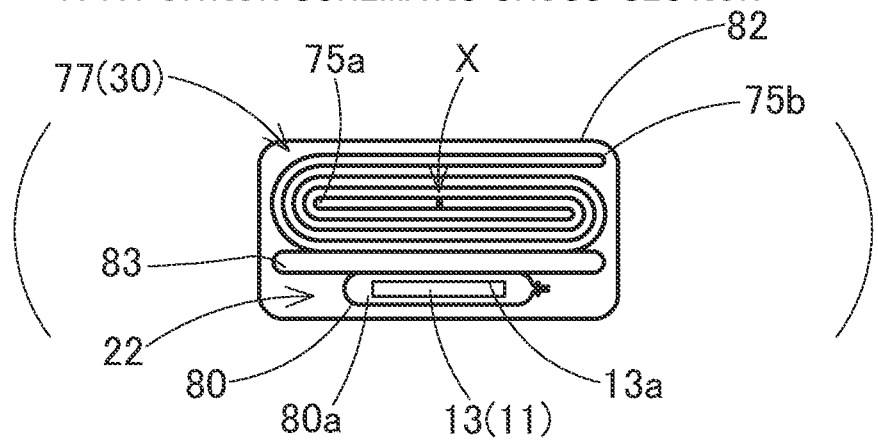

FIG. 10A  INITIAL OPERATING STATE
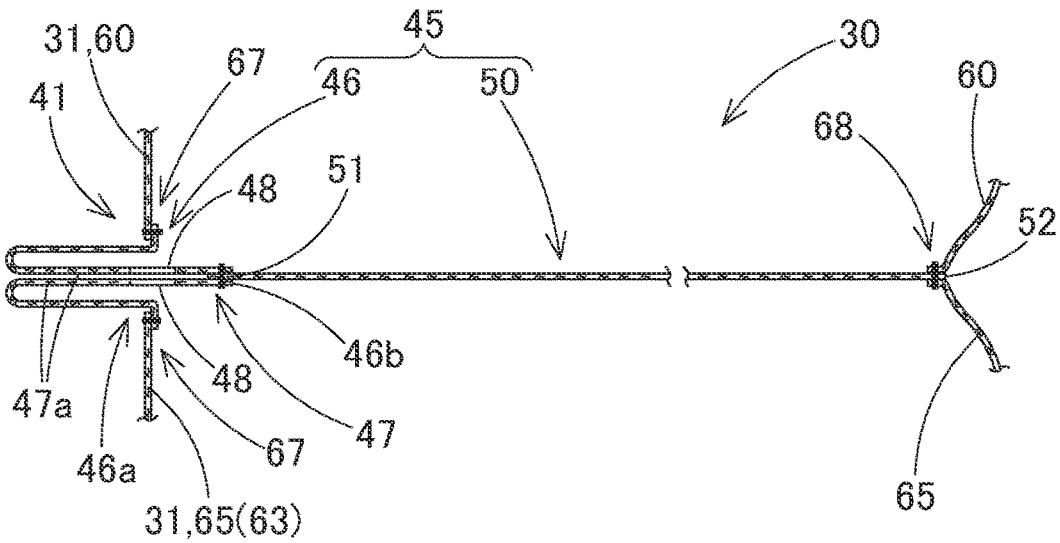
FIG. 10B  EXHAUST PORT OPENED STATE
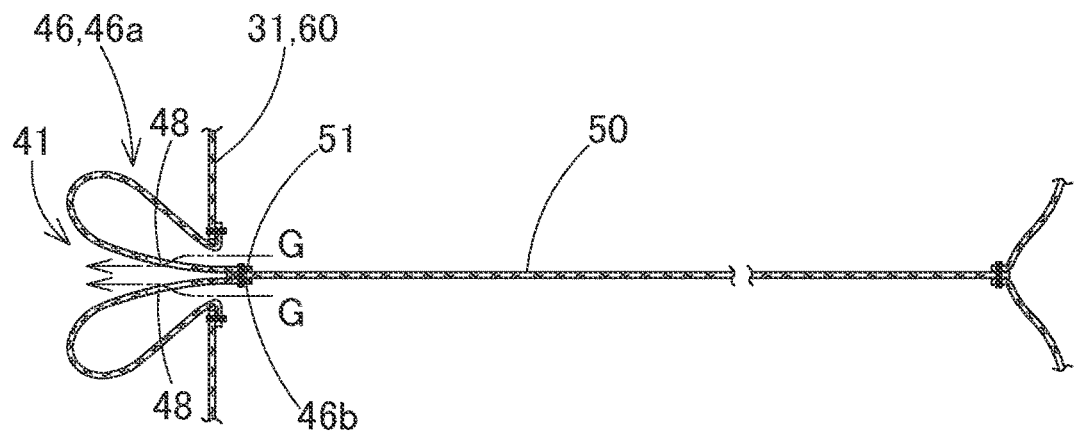
FIG. 10C  EXHAUST PORT CLOSED STATE
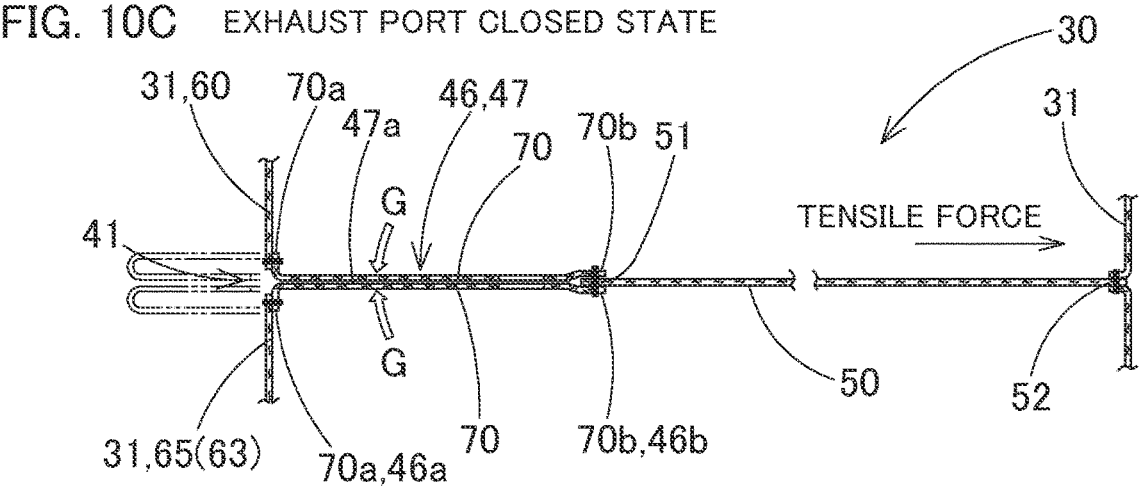

FIG. 11A  INITIAL OPERATING STATE
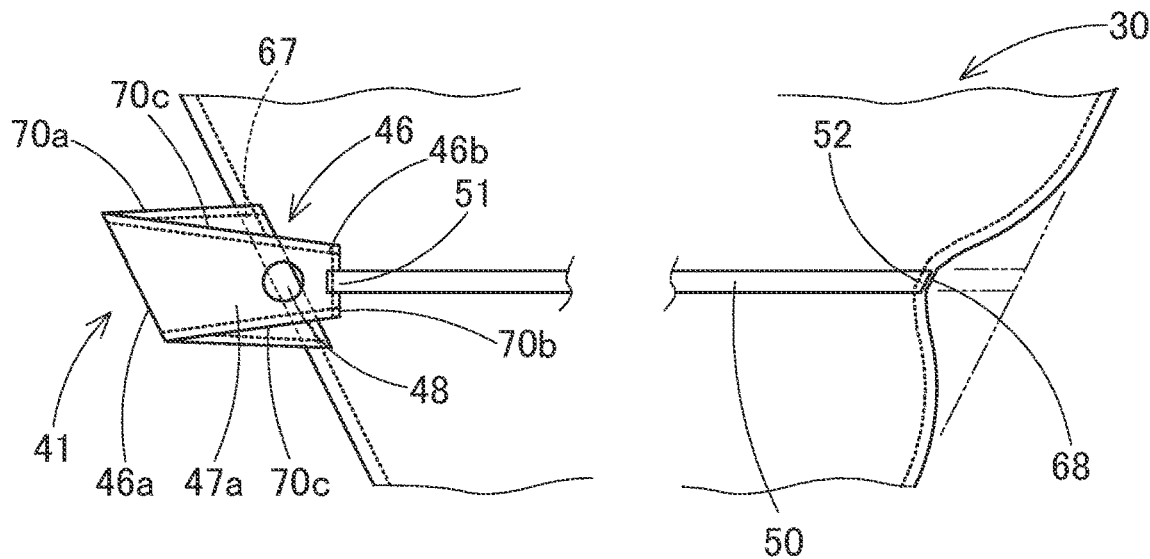
FIG. 11B  EXHAUST PORT OPENED STATE
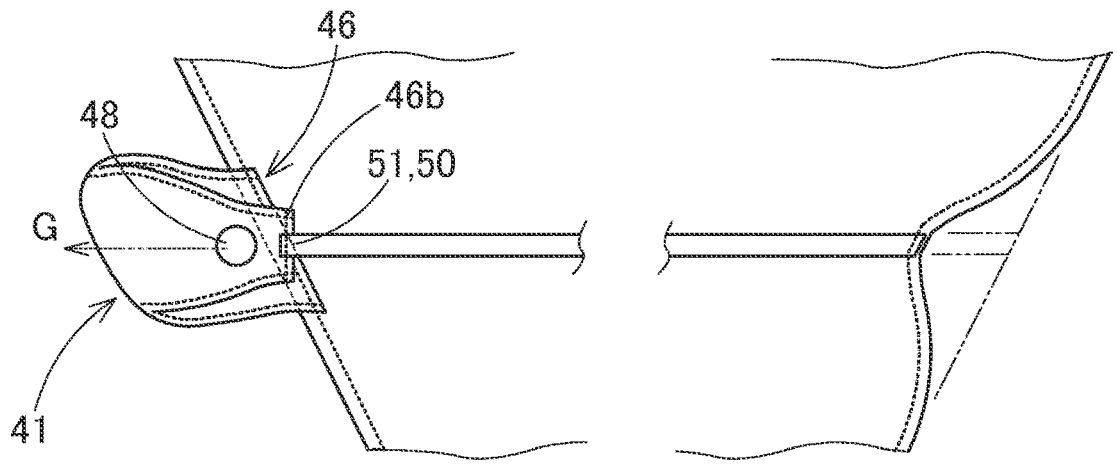
FIG. 11C  EXHAUST PORT CLOSED STATE
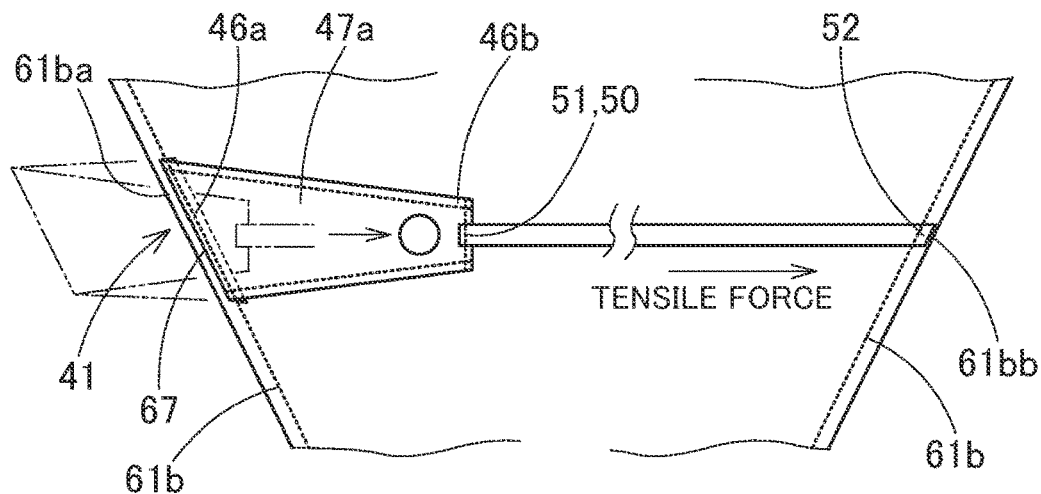

FIG. 17A  INITIAL OPERATING STATE
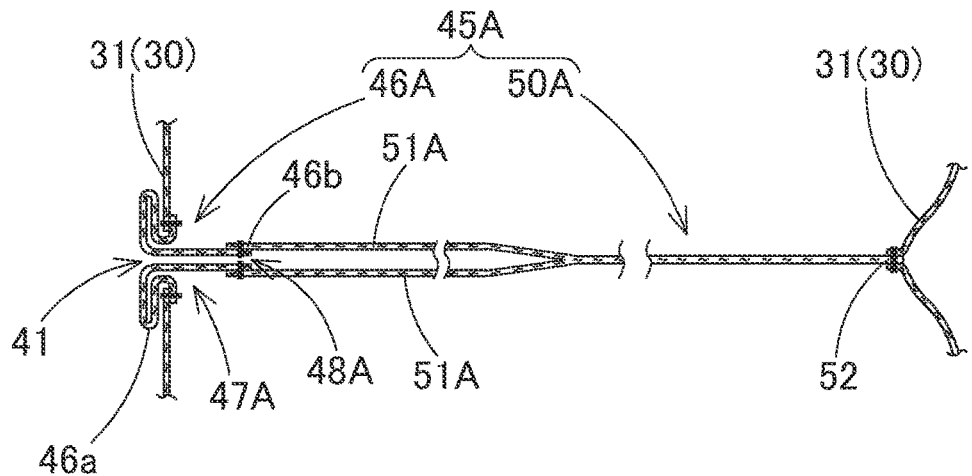
FIG. 17B  EXHAUST PORT OPENED STATE
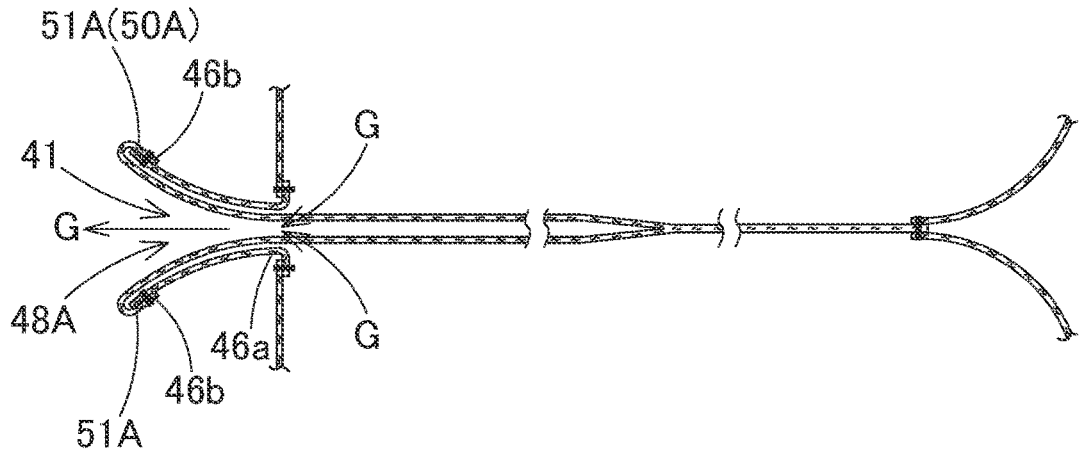
FIG. 17C  EXHAUST PORT CLOSED STATE
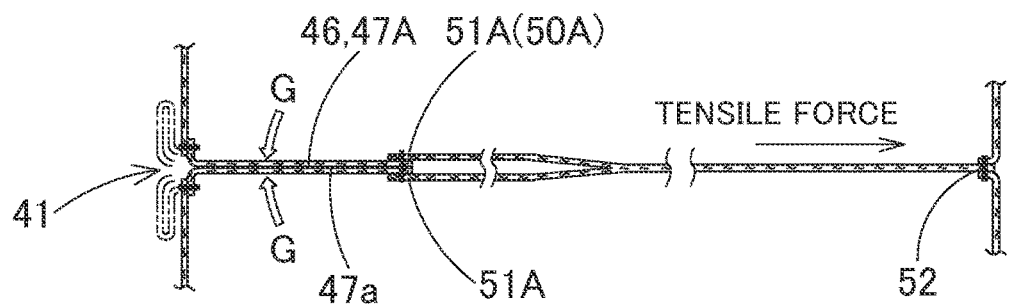

OCCUPANT PROTECTION DEVICE

The present application claims priority from Japanese Patent Application No. 2021-159078 of Matsuzaki et al, filed on Sep. 29, 2021 the disclosures of which are hereby incorporated into the present application by reference.

BACKGROUND

1. Field of the Invention

The present invention relates to an occupant protection device for protecting an occupant seated in a seat.

2. Description of Related Art

As an existing occupant protection device, there is an occupant protection device such that an airbag that inflates owing to an inflating gas being caused to flow in is disposed in a lap belt portion of a seat belt, thereby protecting an occupant seated in a seat (refer to JP-A-2015-5174). The lap belt portion is a belt region disposed on a front side of a waist portion of an occupant seated in a seat, in a state wherein left and right ends are coupled to a left and a right of the seat. The occupant protection device is such that an airbag is housed folded in a housing region provided in the lap belt portion, and when operating, the airbag inflates owing to an inflating gas being caused to flow in, and the completely inflated airbag protects an upper body of an occupant moving forward by receiving the upper body with a rear face side occupant restraining face, in a state wherein a lower face side supported face is supported by a thigh portion of the occupant.

The existing occupant protection device is such that when fixing a child seat to a seat using the seat belt, the lap belt portion is passed through a through hole portion penetrating to the left and right on a bottom face side of a sitting portion of the child seat, after which the child seat can be fixed to the seat, disposed from a backrest portion to the sitting portion of the seat, by coupling the left and right ends of the lap belt portion to the left and right of the seat. However, the occupant protection device is such that an inflating airbag is housed in the lap belt portion of the seat belt. This means that when a vehicle crashes, and the airbag housed in the lap belt portion inflates in such a way as to protrude, in a state wherein the child seat is fixed to a seat, the child seat is pushed up, which is undesirable.

Consequently, an occupant protection device is such that when protrusion of an airbag housed in a lap belt portion is restricted, it is preferable that protrusion of the airbag can be restricted by discharging the inflating gas.

SUMMARY

An occupant protection device according to an embodiment is formed to include a lap belt portion disposed, in a state wherein left and right ends are coupled to a left and right of a seat, on a front side of a waist portion of an occupant seated in the seat, and an airbag that is housed folded up in a housing region of the lap belt portion and, when inflation is completed by an inflating gas being caused to flow in, has a lower face side as a supported face that is supported by a thigh portion of the occupant, and a rear face side as an occupant restraining face that receives an upper body of the occupant who moves forward. The airbag includes an exhaust port that can discharge the inflating gas flowing in, and a regulating valve mechanism that opens and closes the exhaust port. The regulating valve mechanism permits a discharge of the inflating gas from the exhaust port when a protrusion upward from the housing portion when the airbag inflates is restricted, and restricts a discharge of the inflating gas from the exhaust port when a protrusion upward from the housing portion when the airbag inflates is not restricted.

BRIEF DESCRIPTION OF THE DRAWINGS

FIG. 3 is a front view of the seat on which the occupant protection device of the embodiment is mounted, and shows a state seat belt is fastened to an occupant, in addition to which, an airbag when inflated is indicated by double-dotted lines.

FIGS. 10A, 10B, and 10C are schematic sectional views showing an initial operating state, an opened state, and a closed state in a vicinity of an exhaust port of the airbag of the occupant protection device of the embodiment.

FIGS. 11A, 11B, and, 11C are schematic views seen from a front side showing an initial operating state, an opened state, and a closed state in a vicinity of the exhaust port of the airbag of the occupant protection device of the embodiment.

FIGS. 17A, 17B, and 17C is schematic longitudinal sectional views showing an initial operating state, an opened state, and a closed state in a vicinity of an exhaust port showing a modification of a regulating valve mechanism of the embodiment.

DETAILED DESCRIPTION

Figure 1:
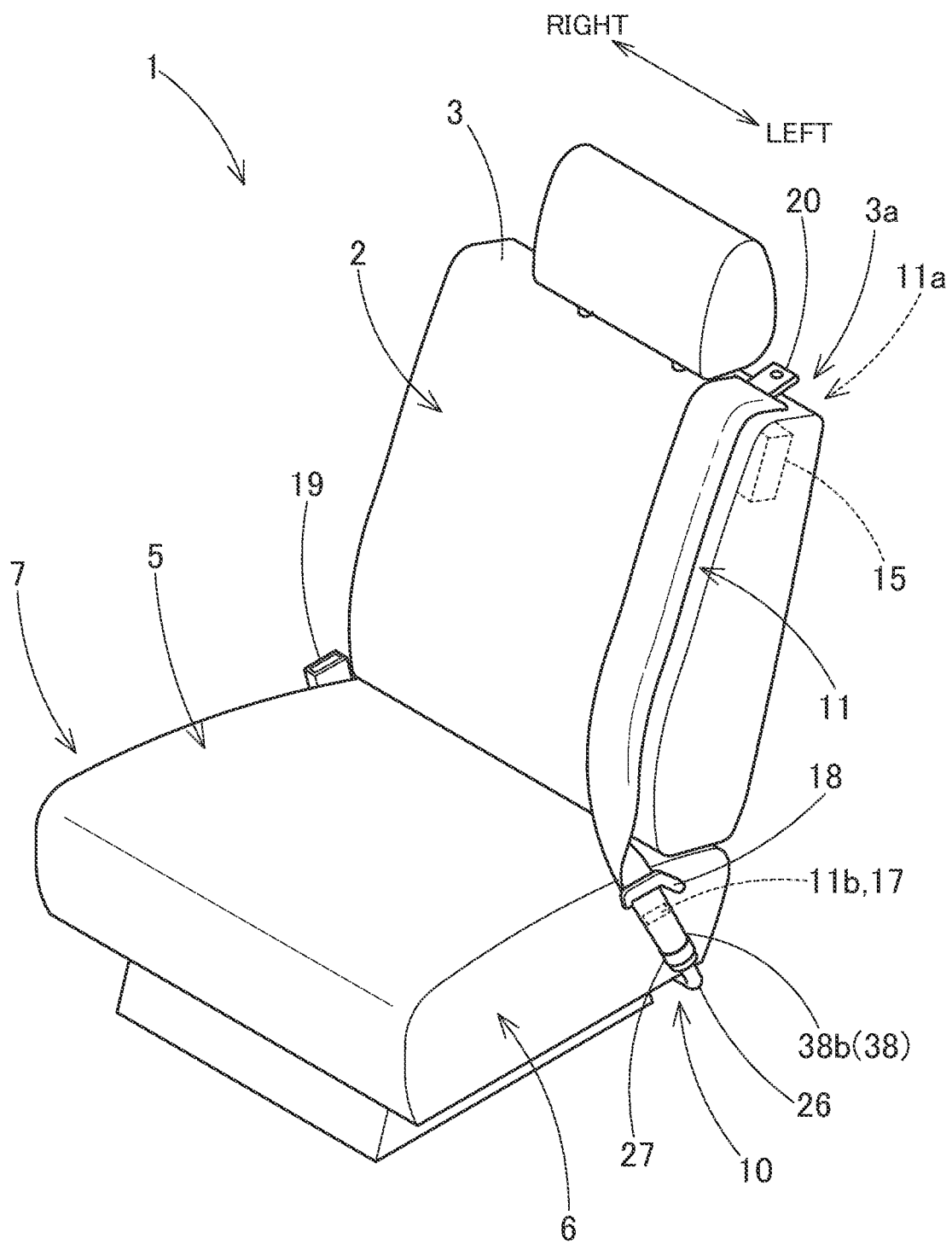
FIG. 1 is a perspective view of a seat on which an occupant protection device that is an embodiment is mounted.

Preferred embodiments of the present invention are described below with reference to accompanying drawings. However, the invention is not limited to the embodiments disclosed herein. All modifications within the appended claims and equivalents relative thereto are intended to be encompassed in the scope of the claims.

An occupant protection device 10 of an embodiment is mounted on a seat 1 of a vehicle, as shown in FIGS. 1 to 6. The occupant protection device 10 of the embodiment includes a seat belt 11, an airbag 30, an inflator 24 that supplies an inflating gas to the airbag 30, and a regulating valve mechanism 45. The regulating valve mechanism 45 discharges the inflating gas from the airbag 30 when the inflated airbag 30 interferes with an obstacle (for example, a child seat 90 (refer to FIGS. 12 and 13)). The seat 1 includes a backrest portion 2 and a sitting portion 5.

The seat belt 11 restrains an occupant MP seated in the seat 1. The seat belt 11 is such that an upper end 11a side is disposed on one left-right direction side (the left side in the embodiment) of the seat 1, and can be fed out from a retractor 15. The retractor 15 is disposed in an interior on a left edge 3a side of an upper end 3 of the backrest portion 2. Also, the seat belt 11 is such that a lower end 11b side is fixed as a fixed end to an anchoring member 17 disposed on a left side portion 6 side of the sitting portion 5.

Figure 2:
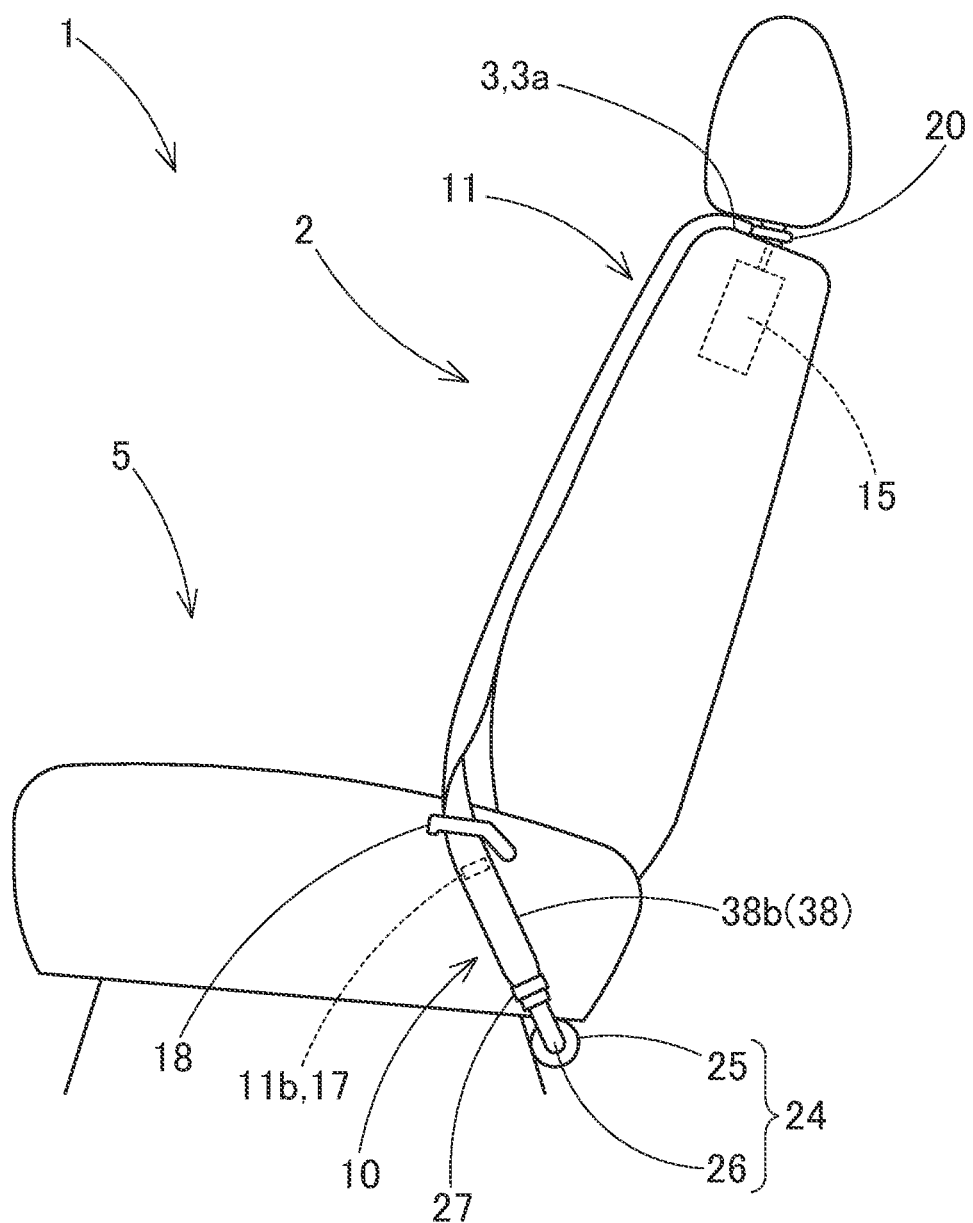
FIG. 2 is a left side view of the seat on which the occupant protection device of the embodiment is mounted.
Figure 4:
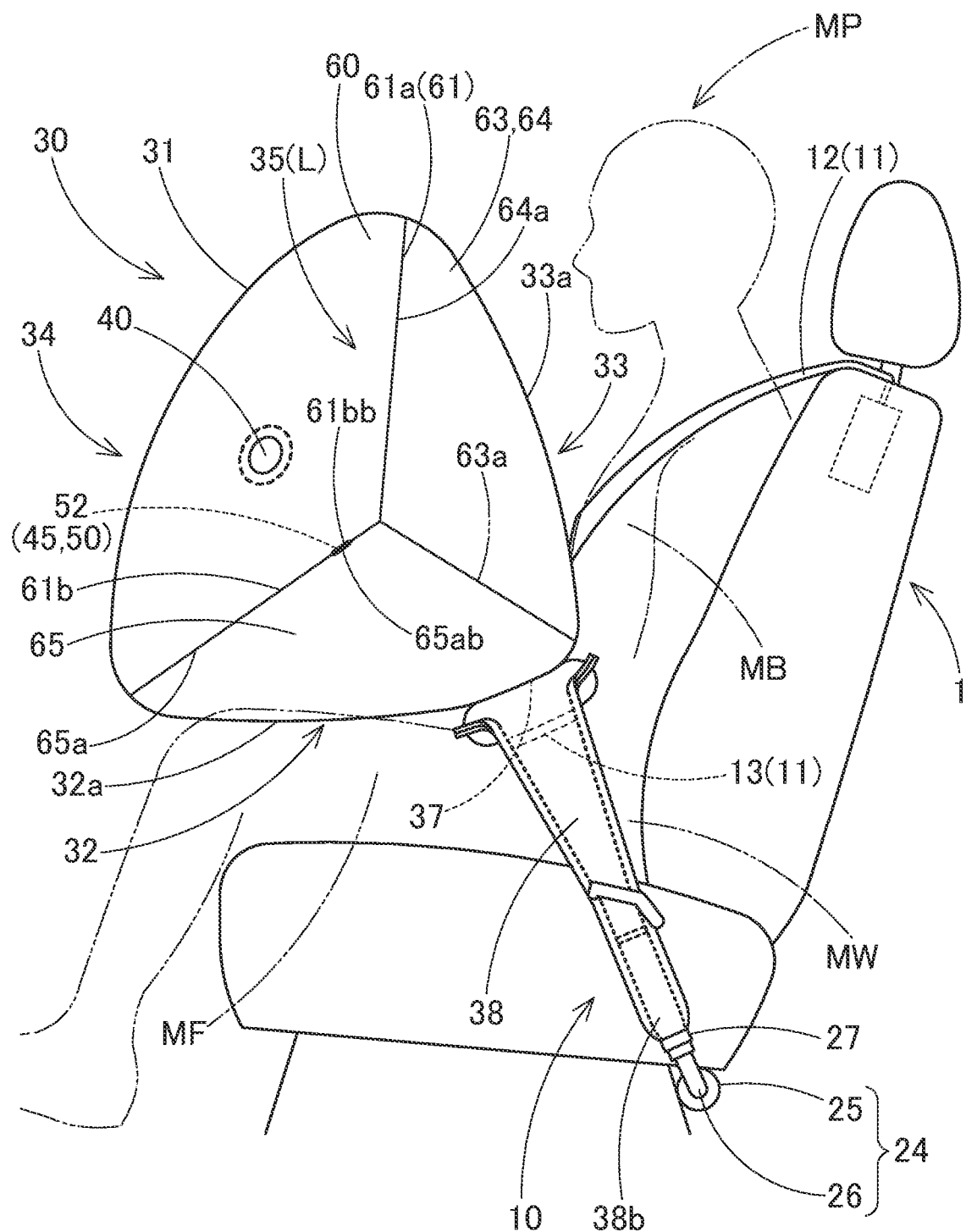
FIG. 4 is a left side view showing a state wherein the airbag of the occupant protection device of the embodiment is inflated.
Figure 5:
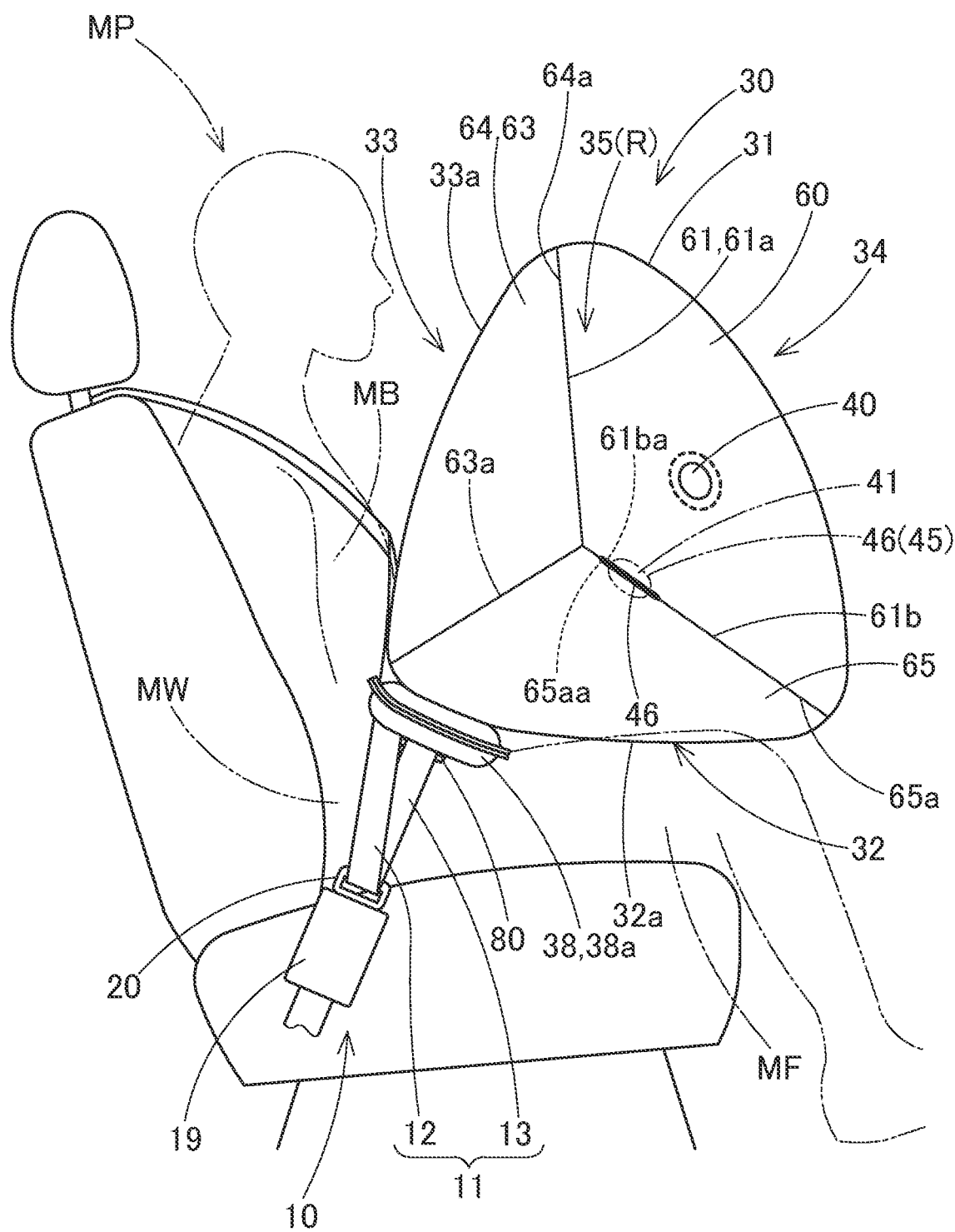
FIG. 5 is a right side view showing a state wherein the airbag of the occupant protection device of the embodiment is inflated.

A member with a reference sign 18 shown in FIGS. 1 and 2 is a retaining member, and the retaining member 18 retains the seat belt 11 in such a way that the seat belt 11 does not become detached from the left side portion 6 of the sitting portion 5 by enabling the seat belt 11 to pass through.

A tongue 20 is disposed in an intermediate region of the seat belt 11. The tongue 20 is fastened to a buckle 19. The buckle 19 is disposed on a right side portion 7 side of the sitting portion 5 on another left-right direction side (the right side in the embodiment) of the seat 1. Further, the seat belt 11 is such that, in a state wherein the tongue 20 is fastened to the buckle 19, a region extending to the retractor 15 side from the tongue 20 is a shoulder belt portion 12 disposed on a front face side of an upper body (chest portion) MB of the occupant MP, and a region extending from the tongue 20 to the fixed end 11b side is a lap belt portion 13 disposed on a front face side of a waist portion MW of the occupant MP. An unshown release button is disposed in the buckle 19. This means that by carrying out an operation of pressing the release button when unfastening the tongue 20 fastened to the buckle 19, the tongue 20 can be removed from the buckle 19. Also, when there is an abrupt withdrawal of the seat belt 11, the retractor 15 causes the withdrawal to stop. Furthermore, the retractor 15 incorporates an unshown pretensioner. Because of this, the seat belt 11 is wound in by the pretensioner when there is a vehicle collision or the like.

The inflator 24 is attached to and fixed to a rear face side of the sitting portion 5 of the seat 1 (refer to FIGS. 1 and 2). The inflator 24 includes an inflator main body 25 of an approximately cylindrical form, which emits an inflating gas, and a pipe portion 26, which protrudes from the inflator main body 25 and bends in an approximate L-form. A leading end portion 38b side of a conduit portion 38 connected to the airbag 30 is mounted externally, and coupled to the pipe portion 26 using a clamp 27.

The conduit portion 38 is such that a base portion 38a side is coupled to an inlet portion 37 for causing an inflating gas of the airbag 30 to flow in.

The airbag 30 is housed as a folded up folded body 77 in a housing region 22 of the lap belt portion 13 in the seat belt 11. The housing region 22 is a vicinity of a left-right direction center on an upper face 13a side of the lap belt portion 13. The folded body 77 is disposed in the housing region 22 of the lap belt portion 13 wrapped in a cover 82 that breaks when the airbag 30 inflates. The conduit portion 38 is connected to the folded body 77 when housed. Specifically, the conduit portion 38 extends from the inflator 24, and is for causing an inflating gas from the inflator 24 to flow into the airbag 30. Further, the conduit portion 38 is connected to the inlet portion 37 of the airbag 30 that is the folded body 77.

The airbag 30 is formed from a woven fabric having flexibility, such as polyester. In the same way as the airbag 30, the conduit portion 38 is also formed from a woven fabric having flexibility, such as polyester. Also, a valve body 46 and a strap 50, to be described hereafter, configuring the regulating valve mechanism 45 are also formed from a woven fabric having flexibility, such as polyester.

The airbag 30 is of a configuration such that, when completely inflated, a peripheral wall 31 inflates into an approximately triangular prismatic form as seen from a side. The peripheral wall 31 includes a bottom face side bottom wall portion 32, a rear face side rear wall portion 33, a front face side front wall portion 34, and left and right side wall portions 35 (L and R). Further, the airbag 30 when completely inflated is such that a lower face side of the bottom wall portion 32 is a supported face 32a that is supported by a thigh portion MF of the occupant MP, and a rear face side of the rear wall portion 33 is an occupant restraining face 33a. Further, the airbag 30 protects the upper body MB of the occupant MP who moves forward by receiving the upper body MB with the occupant restraining face 33a.

Figure 6:
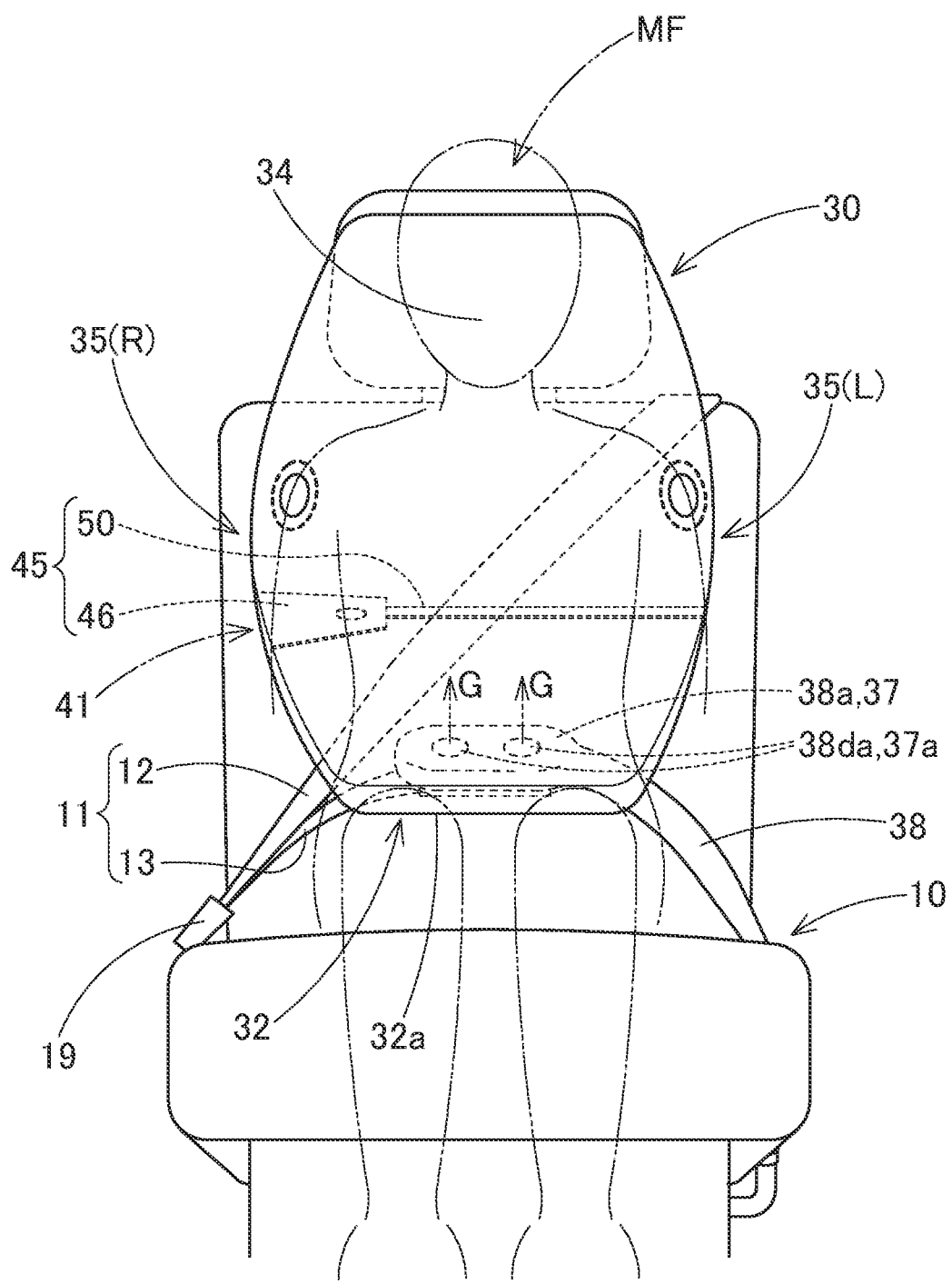
FIG. 6 is a front view showing a state wherein inflation of the airbag of the occupant protection device of the embodiment is completed.
Figure 7:
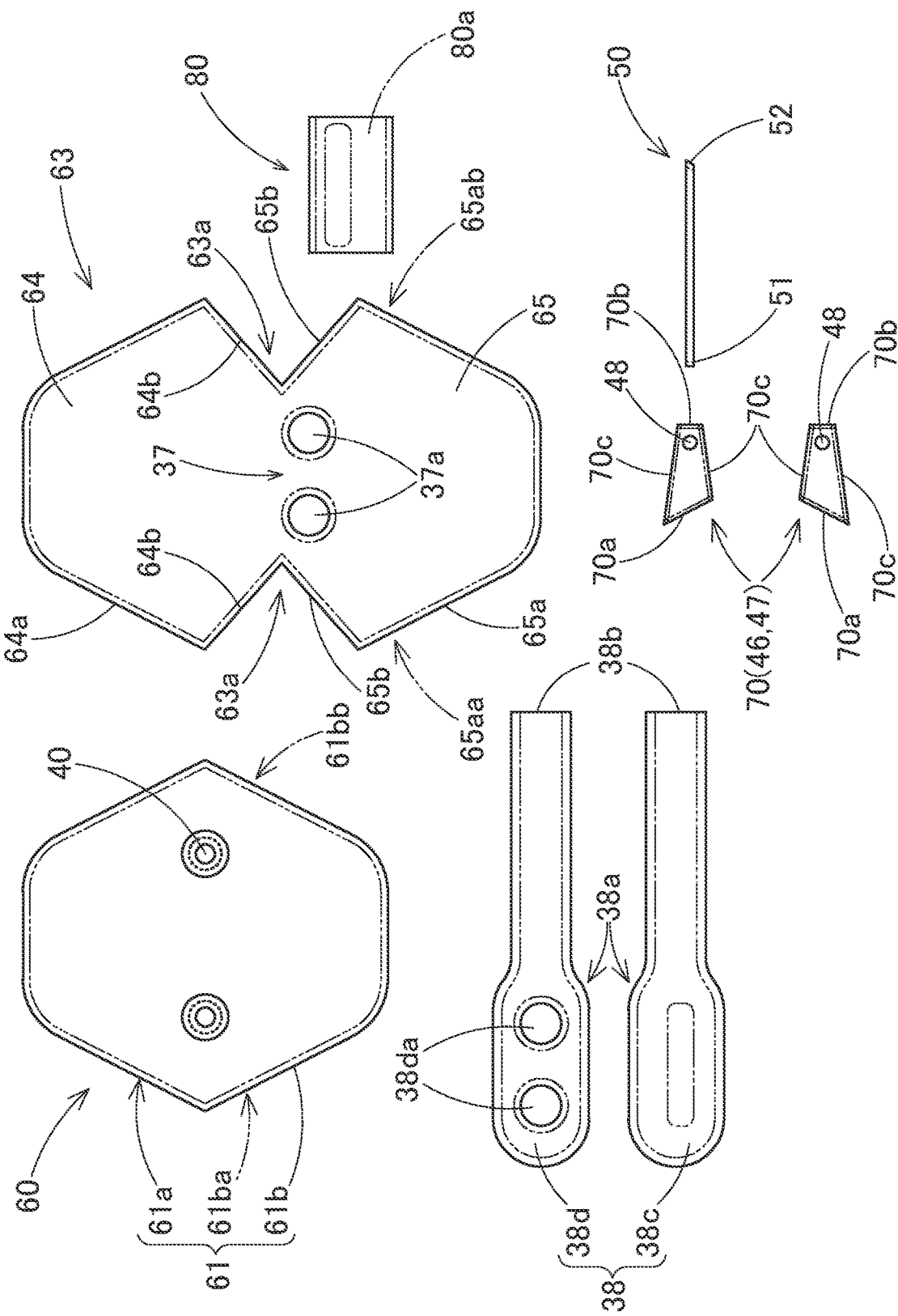
FIG. 7 is a plan view showing materials configuring the airbag of the occupant protection device of the embodiment.
Figure 8:
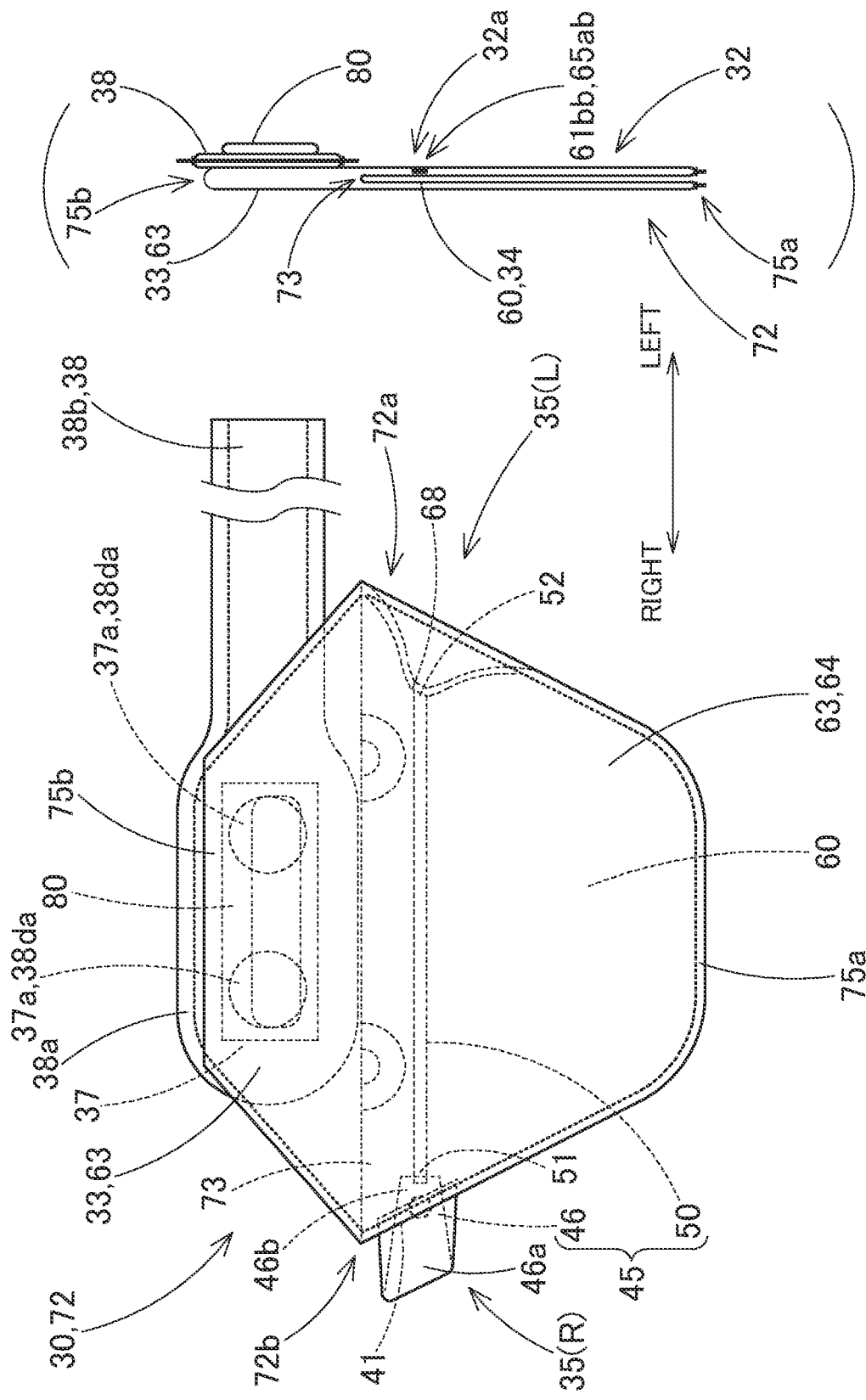
FIG. 8 is a plan view showing an initial stage airbag when folding the airbag of the occupant protection device of the embodiment.

The inlet portion 37 is disposed in a vicinity of a rear edge of the bottom wall portion 32 (refer to FIGS. 6 to 8). The inlet portion 37 includes a multiple of inlets 37a for causing an inflating gas from the conduit portion 38 to flow in. Also, a venthole 40 through which excess inflating gas flowing into the airbag 30 is discharged is disposed in front sides of the left and right side wall portions 35L and 35R.

Furthermore, an exhaust port 41 through which inflating gas is discharged is disposed in the right side wall portion 35R of the airbag 30. Inflating gas is discharged through the exhaust port 41 in such a way as to restrict inflation when the airbag 30 interferes with an obstacle while inflating. The valve body 46 and the strap 50 are disposed on a peripheral edge of the exhaust port 41. The valve body 46 and the strap 50 configure the regulating valve mechanism 45. The regulating valve mechanism 45 enables the exhaust port 41 to open and close, and permits a discharge of inflating gas from the exhaust port 41 when a protrusion upward of the airbag 30 from the housing region 22 when operating (when inflating) is restricted. Also, the regulating valve mechanism 45 restricts a discharge of inflating gas from the exhaust port 41 when a protrusion upward of the airbag 30 from the housing region 22 when operating is not restricted.

Further, the valve body 46 is a tubular body 47 having flexibility. The valve body 46 is such that a base portion 46a is joined to the peripheral edge of the exhaust port 41. Specifically, the tubular body 47 acting as the valve body 46 is formed of two valve body base fabrics 70 and 70 of the same trapezoidal form, as shown in FIGS. 7, 10A, 10B, 10C, 11A, 11B, and 11C. Further, the valve body 46 is formed by a base side edge 70a on a bottom side side of the valve body base fabric 70 being sewn to an inner peripheral edge of the exhaust port 41, and by leading side edges 70b of the valve body base fabrics 70 and 70, and side edges 70c and 70c, being sewn to each other.

One end side of the strap 50 is coupled as a valve body side end portion 51 to a leading end portion 46b of the valve body 46. When the leading side edges 70b of the valve body base fabrics 70 and 70 are sewn to each other, the valve body side end portion 51 is sewn together with the leading side edges 70b (sewn coinciding with the leading side edges 70b). Because of this, the valve body side end portion 51 is coupled to the leading end portion 46b side of the valve body 46. Also, another end side of the strap 50 is coupled as a peripheral wall side end portion 52 to the left side wall portion 35L on a side opposite to that of the exhaust port 41. When outer peripheral edges 61 and 65a of a front side base fabric 60 and a rear side base fabric 63, to be described hereafter, configuring the peripheral wall 31 of the airbag 30 are sewn together, the peripheral wall side end portion 52 is sewn together with the outer peripheral edges 61 and 65a, thereby being coupled to the left side wall portion 35L side.

Further, the valve body 46 of the regulating valve mechanism 45 is such that a multiple (two in the embodiment) of vents 40 are formed opening in a circular form penetrating inner and outer peripheries in a vicinity of the leading end portion 46b. The vents 48 are disposed in vicinities of the leading side edges 70b of the two valve body base fabrics 70 and 70. As shown in FIG. 10C and FIG. 11C, a state wherein the exhaust port 41 closed by the valve body 46 is such that when the leading end portion 46b of the valve body 46 is pulled strongly into the airbag 30 due to being pulled by the strap 50, peripheral walls of peripheral edges on the base portion 46a side, that is, inner peripheral face 47a sides of the tubular body 47, are pressed together in such a way as to come into close contact with each other by pressure of an inflating gas G (in the embodiment, the valve body base fabrics 70 and 70 are brought into close contact superimposed one on the other). As a result of this, an inner peripheral side of the exhaust port 41 of the airbag 30 is closed. Meanwhile, as shown in FIG. 10B and FIG. 11B, an opened state of the exhaust port 41 is such that when a state wherein the valve body 46 is not subjected to pulling by the strap 50 exists, the valve body 46 is pushed out from the exhaust port 41 by the pressure of the inflating gas G. That is, the tubular body 47 is pushed outside the airbag 30 in such a way as to cause a vicinity of the vents 48 to be disposed farther to an outer side of the airbag 30 than the exhaust port 41. As a result of this, the inflating gas G inside the airbag 30 is discharged to the outside of the airbag 30 from the exhaust port 41, while passing through the vents 48, and the exhaust port 41 attains an opened state.

A length dimension of the regulating valve mechanism 45 from the valve body side end portion 51 to the peripheral wall side end portion 52 of the strap 50 is as follows. Firstly, when inflation of the airbag 30 is completed, the length dimension is a length dimension such that the valve body 46 can be pulled strongly into the airbag 30 (a length dimension such that the exhaust port 41 can be closed), within a range such that restraining of the occupant MP by the occupant restraining face 33a is not impeded. Also, when inflation of the airbag 30 is restricted, that is, when swelling of the side wall portion 35R to which the peripheral wall side end portion 52 is coupled is restricted, and an amount of movement of the peripheral wall side end portion 52 is slight, the length dimension is a length dimension such that the valve body 46 is not pulled (a length dimension such that the exhaust port 41 can be opened).

As shown in FIG. 7, the peripheral wall 31 of the airbag 30 is formed of the rear side base fabric 63 and the front side base fabric 60. The rear side base fabric 63 configures the rear wall portion 33, the bottom wall portion 32, and, a rear portion side of the left and right side wall portions 35 (L and R) of the peripheral wall 31 (refer to FIGS. 4 to 6). The front side base fabric 60 configures the front wall portion 34, and, a front portion side of the left and right side wall portions 35 (L and R) (refer to FIGS. 4 to 6). The rear side base fabric 63 is provided with slits 63a and 63a on the left and right, and includes an upper side portion 64 of an approximately hexagonal plate form on an upper side of the slit 63a, and a lower side portion 65 of an approximately hexagonal plate form on a lower side of the slit 63a. The front side base fabric 60 is of a large hexagonal plate form. Further, the peripheral wall 31 is formed by firstly providing the venthole 40 and the inlet 37a in the rear side base fabric 63, then sewing opposing edges 64b and 65b, which are opposed in a region of the slit 63a of the rear side base fabric 63, to each other. Next, the upper side portion 64, excepting the region of the slit 63a, and the lower side portion 65 are flattened, and the front side base fabric 60 is placed thereon. Then, the peripheral wall 31 can be formed by coinciding outer peripheral edges 61, 64a, and 65a being sewn to each other. An upper side outer peripheral edge 61a of the front side base fabric 60 is of the same form as the outer peripheral edge 64a of the upper side portion 64 of the rear side base fabric 63, and in the same way, a lower side outer peripheral edge 61b of the front side base fabric 60 is of the same form as the outer peripheral edge 65a of the lower side portion 65 of the rear side base fabric 63. Because of this, sewing together of the front side base fabric 60 and the rear side base fabric 63 can be carried out easily by superimposing the front side base fabric 60 and the rear side base fabric 63 one on the other. Also, the conduit portion 38, to which a belt attachment portion 80 that is not of tubular form is attached, is attached in advance to the inlet portion 37 provided with the inlet 37a of the rear side basic fabric 63. The conduit portion 38 is formed by outer peripheral edges of an outer side material 38c and a bag side material 38d, whose external forms are the same, being sewn to each other. The bag side material 38d is sewn to an outer peripheral face side of the inlet portion 37, and includes a communication port 38da that communicates with the inlets 37a and 37a.

Also, in the case of the embodiment, the base side edge 70a of the valve body base fabric 70 is sewn to each of regions 61ba and 65aa (refer to FIG. 7) of the lower side outer peripheral edge 61b of the front side base fabric 60 of a region in which the exhaust port 41 is formed and the outer peripheral edge 65a of the lower side portion 65 of the rear side base fabric 63, in a vicinity of the exhaust port 41. At this time, the region of the exhaust port 41 is not closed. Further, the lower side outer peripheral edge 61b of the front side base fabric 60 on a peripheral edge of the exhaust port 41 and the outer peripheral edge 65a of the lower side portion 65 of the rear side base fabric 63 are sewn together. Also, the valve body base fabrics 70 and 70 are such that the side edges 70c and 70c are sewn to each other, and the leading side edges 70b and 70b are sewn to each other together with the valve body side end portion 51 of the strap 50. The peripheral wall side end portion 52 of the strap 50 is sewn together with strap coupling regions 61bb and 65ab (refer to FIG. 7) when the lower side outer peripheral edge 61b of the front side base fabric 60 and the outer peripheral edge 65a of the lower side portion 65 of the rear side base fabric 63 are sewn together. Further, the peripheral wall 31 of the airbag 30 provided with the conduit portion 38 can be formed by the lower side outer peripheral edge 61b of the front side base fabric 60 and the outer peripheral edge 65a of the lower side portion 65 of the rear side base fabric 63 being sewn together, and the upper side outer peripheral edge 61a of the front side base fabric 60 and the outer peripheral edge 64a of the upper side portion 64 of the rear side base fabric 63 being sewn together.

Figure 9A:
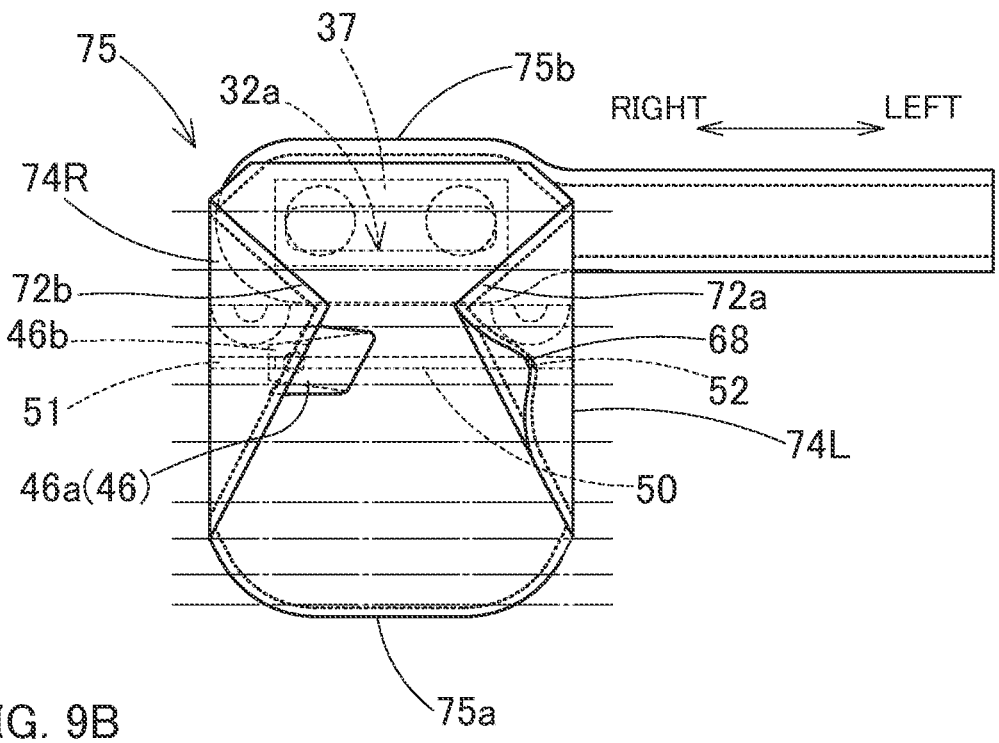
FIGS. 9A, 9B, 9C, and 9D are a drawing showing an order of steps of folding the airbag of the occupant protection device of the embodiment.

The folded body 77 of the airbag 30 housed in the housing region 22 is formed as shown in FIGS. 8, 9A, 9B, 9C and 9D. Firstly, as shown in FIG. 8, the front wall portion 34 and the rear wall portion 33 opposed in a front-rear direction of the airbag 30 when inflation is completed are superimposed one on the other, and furthermore, in the case of the embodiment, a crease 73 in the left-right direction is formed, and a folding in two is carried out on the front wall portion 34 side, whereby a flattened initial stage airbag 72 is formed. In other words, the initial stage airbag 72 is formed by folding the front wall portion 34 in two while flattening a vicinity of the inlet portion 37 that causes the inflating gas G to flow into the airbag 30, superimposing the rear wall portion 33, which is a peripheral wall region of the airbag 30, above the vicinity of the inlet portion 37, and flattening. Further, when forming the initial stage airbag 72, the strap 50 is disposed in the left-right direction. Also, while disposing the vents 46 in a vicinity of the exhaust port 41, the base portion 46a side of the valve body 46 is put into a state pushed to the outside of the airbag 30 from the exhaust port 41. Furthermore, the peripheral wall side end portion 52 of the strap 50 is put into a state placed inside the airbag 30 in such a way as to approach the valve body 46 side. Next, as shown in FIG. 9A, a width direction reduced body 75 is formed by both edges 72a and 72b in the left-right direction, which is a width direction of the initial stage airbag 72, being folded to a central side using a width direction reduction fold. The width direction reduction fold may be omitted when a left-right direction width dimension of the folded body 77 or the housing region 22 can be increased.

Figure 9B:
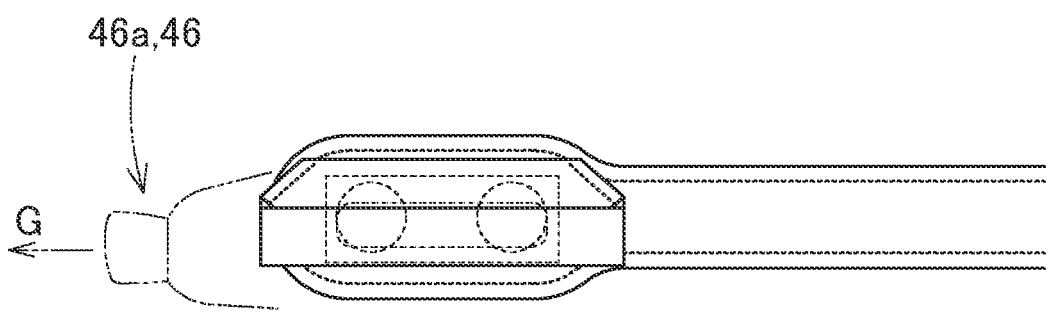
Figure 9C:
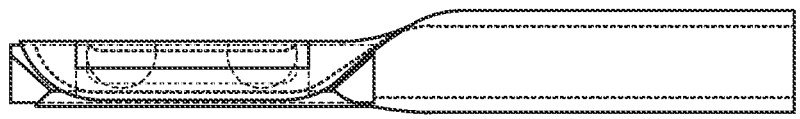
Figure 9D:
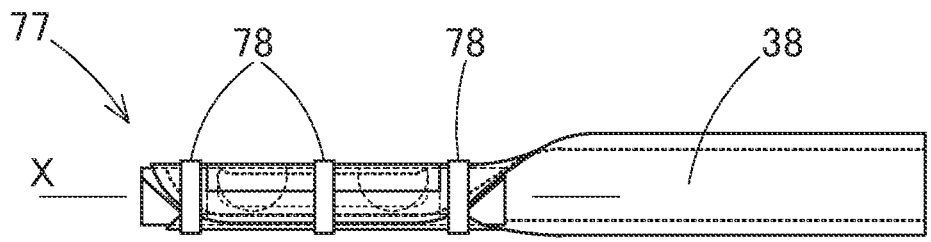

Subsequently, as shown in FIGS. 9A, 9B, and 9C, the folded body 77 is formed by end edges 75a and 75b being folded in a direction perpendicular to the left-right direction of the width direction reduced body 75 using a longitudinal direction reduction fold that causes the end edges 75a and 75b superimposed one on the other, to approach the inflating gas G inlet portion 37 side disposed on the supported face 32a side of the airbag 30, then wrapped in a breakable tape material 78 that prevents unraveling. The folded body 77 is a columnar body having an axial center X in the left-right direction.

The folded body 77 formed in this way is such that the belt attachment portion 80 is disposed in the housing region 22 of the lap belt portion 13 of the seat belt 11, then the belt attachment portion 80 is sewn in such a way as to enclose the housing region 22, whereby a circular insertion hole 80a is formed. Next, by enclosing the folded body 77, together with the belt attachment portion 80 and the lap belt portion 13, with the cover 82, the folded body 77 can be installed in the lap belt portion 13 of the seat belt 11 (refer to FIG. 3). Furthermore, the leading end portion 38b of the conduit portion 38 extending from the folded body 77 is connected to the pipe portion 26 extending from the inflator main body 25 of the inflator 24. As a result of this, the occupant protection device 10 can be mounted on the seat 1.

The occupant protection device 10 of the embodiment is activated when a vehicle crashes, or the like, in a state wherein the occupant MP seated in the seat 1 has fastened the seat belt 11. At this time, the lap belt portion 13 is disposed on the front side of the waist portion MW of the occupant MP seated in the seat 1. Further, inflating gas from the inflator 24 flows into the airbag 30 from the inlet 37a of the inlet portion 37 via the conduit portion 38.

At this time, as shown in FIGS. 3 to 6, a protrusion upward of the airbag 30 is not restricted provided that there is no obstacle disposed above the housing region 22. Because of this, the airbag 30 inflates in such a way as to protrude upward smoothly from the housing region 22, eliminating the folds, while breaking the tape material 78 and the cover 82. That is, when the airbag 30 inflates, the peripheral wall 31 swells, the peripheral wall side end portion 52 of the strap 50 in the regulating valve mechanism 45 moves in accompaniment to the inflation of the left side wall portion 35L, and the strap 50 pulls the valve body 46 in the regulating valve mechanism 45 into the airbag 30, as shown in FIG. 10A and FIG. 11A to FIG. 10C and FIG. 11C. Because of this, the pressure of the inflating gas G is caused to act, and the tubular body 47 of the valve body 46 is crushed to an inner peripheral side, because of which the regulating valve mechanism 45 closes the exhaust port 41, thereby restricting a discharge of the inflating gas G from the exhaust port 41. Further, the airbag 30 completes inflation swiftly, without inflating gas being discharged from the exhaust port 41. As a result of this, the airbag 30 can protect the occupant MP by receiving the upper body MB of the occupant MP who moves forward with the rear face side occupant restraining face 33a, in a state wherein the lower face side supported face 32a is supported by the thigh portion MF of the occupant MP.

Figure 12:
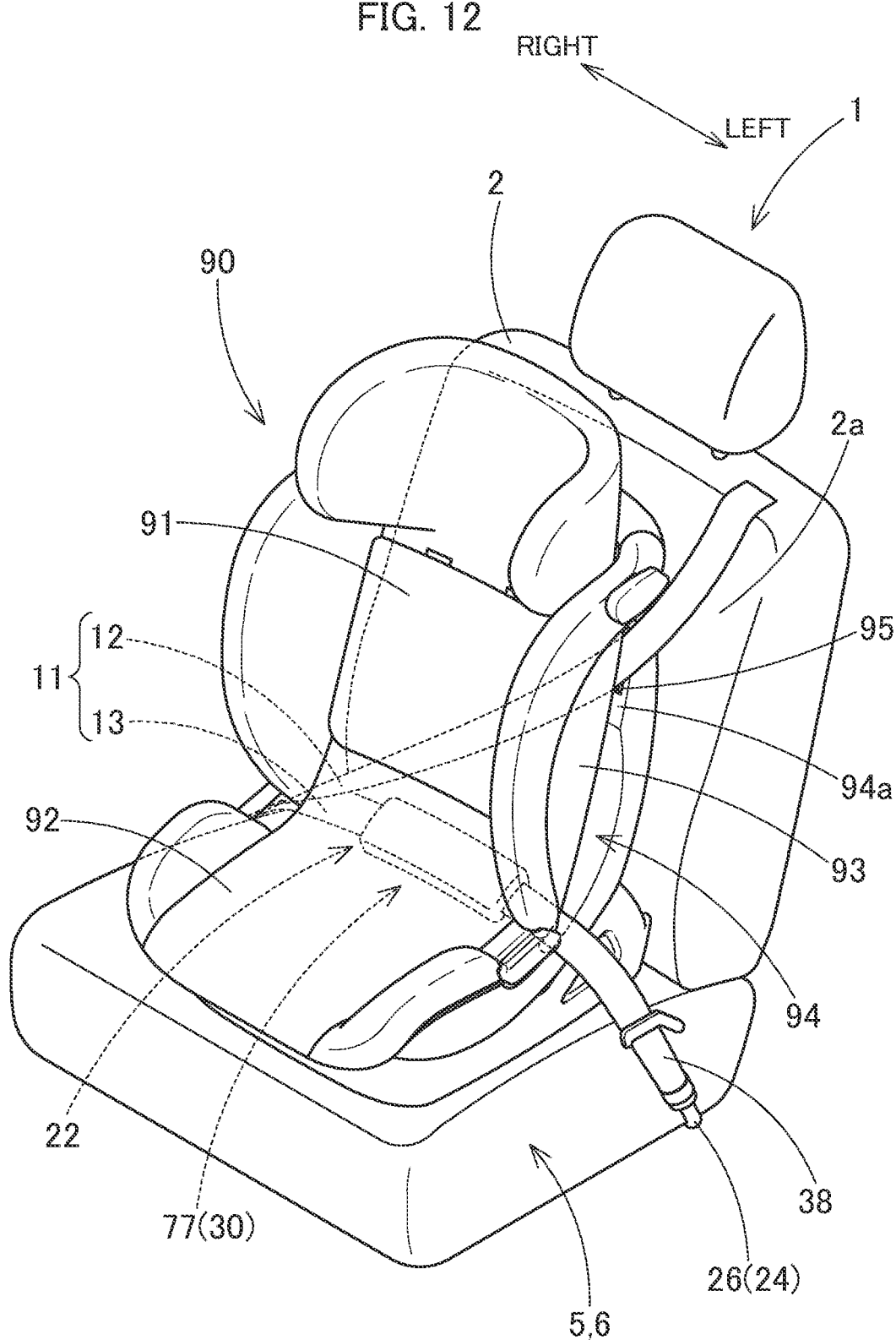
FIG. 12 is a schematic perspective view of a state wherein a child seat is attached to the seat using a lap belt portion of the occupant protection device of the embodiment.
Figure 13:
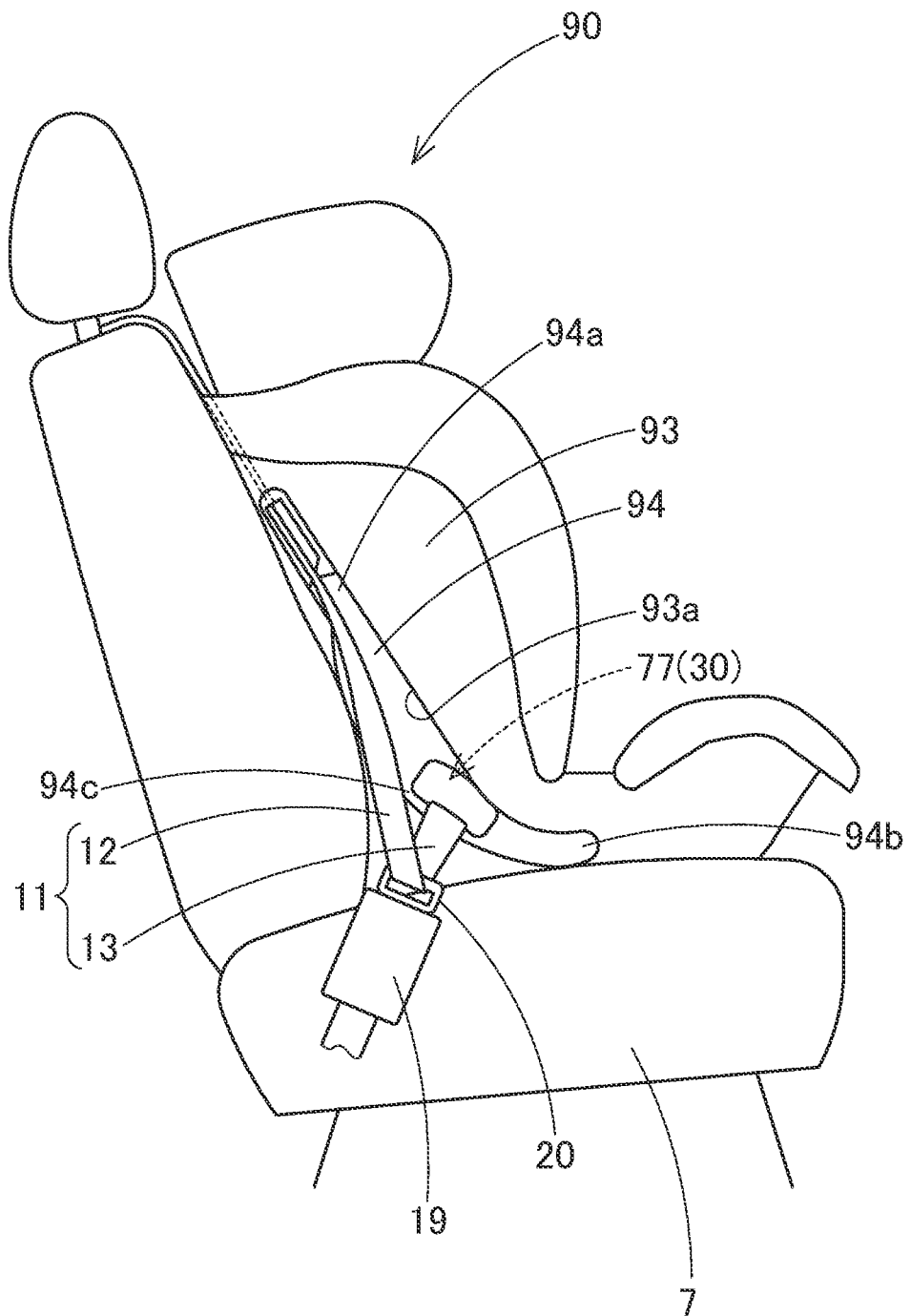
FIG. 13 is a schematic right side view of a state wherein the child seat is attached to the seat using the lap belt portion of the occupant protection device of the embodiment.

Meanwhile, the occupant protection device 10 of the embodiment is such that there is a case wherein a child seat 90 is disposed on the seat 1 utilizing the seat belt 11, as shown in FIG. 12. In this case, the lap belt portion 13 is passed through a through hole portion 94 penetrating to the left and right on a bottom face side of a sitting portion 92 of the child seat 90, and the tongue 20 is fastened to the buckle 19, whereby the left and right ends of the lap belt portion 13 are coupled to the left and right of the seat 1. Owing to this kind of operation, the child seat 90 is disposed from the backrest portion 2 of the seat 1 to the sitting portion 5, and is fixed to the seat 1. The shoulder belt portion 12 of the seat belt 11 is such that the retractor 15 side distanced from the tongue 20 is sandwiched in a holding tool 95. The holding tool 95 is disposed on an upper portion 94a side of the left side face side through hole portion 94 of the child seat 90.

Figure 14:
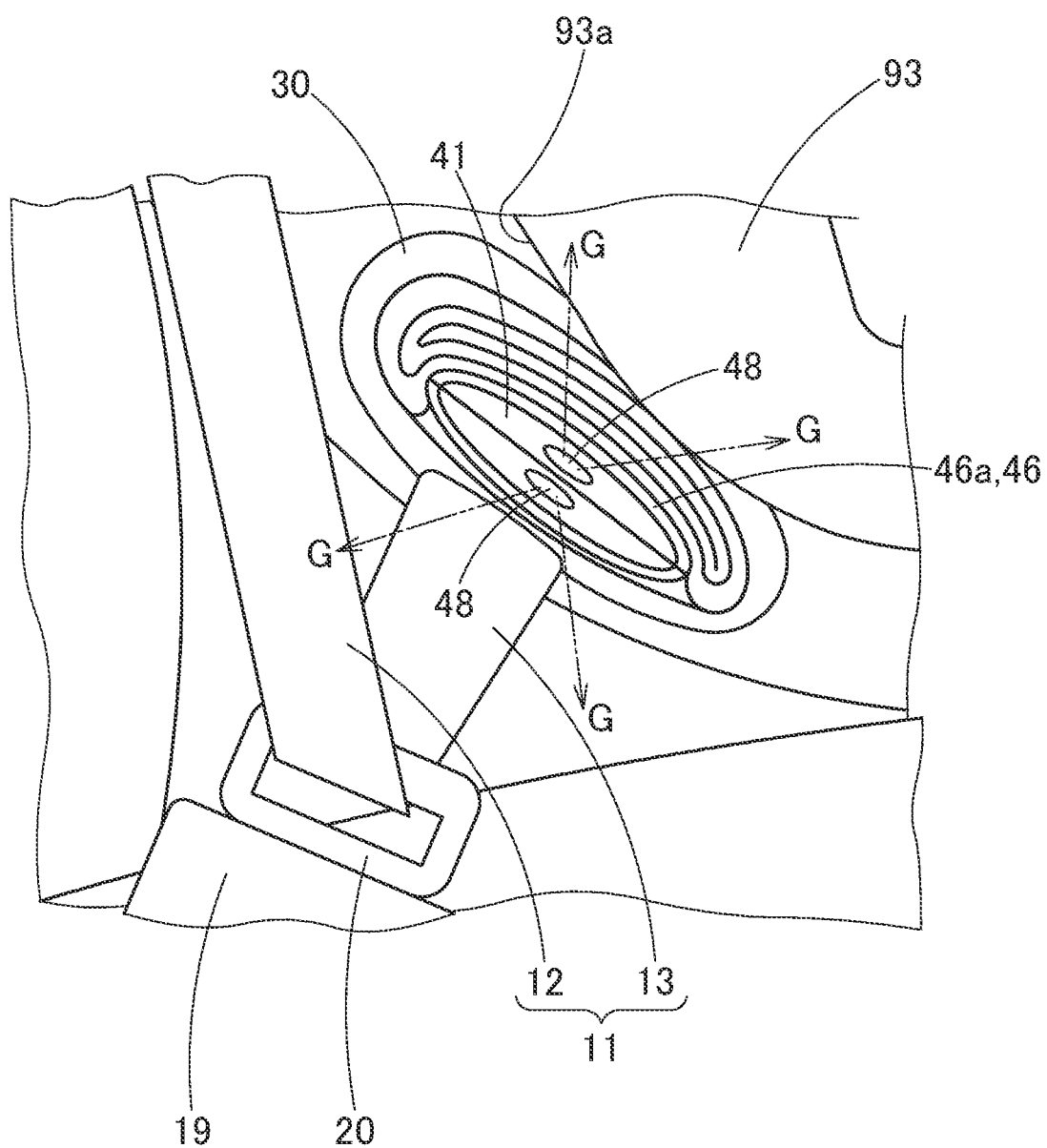
FIG. 14 is a schematic partial right side view illustrating the airbag inflated in a state wherein the child seat is attached to the seat using the lap belt portion of the occupant protection device of the embodiment.

When the child seat 90 is fixed to the seat 1 utilizing the seat belt 11 in this way, the housing region 22 of the airbag 30 in the lap belt portion 13 is in a condition blocked from above by a rear face 93a of a frame 93 of the child seat 90 in a vicinity of a central portion 94c between the upper end portion 94a and a front end portion 94b of the through hole 94. This means that when the occupant protection device 10 attempts to operate in this condition, that is, when the airbag 30 attempts to protrude upward from the housing region 22, the airbag 30 comes into contact with the rear face 93a of the frame 93 of the child seat 90, and protrusion upward from the housing region 22 is restricted. Thereupon, the regulating valve mechanism 45 permits a discharge of the inflating gas G from the exhaust port 41, the inflating gas G is discharged from the exhaust port 41, and inflation of the airbag 30 is restricted. That is, the regulating valve mechanism 45 enables the exhaust port 41 to open and close, permits a discharge of the inflating gas G from the exhaust port 41 when a protrusion upward of the airbag 30 from the housing region 22 when operating is restricted, and restricts a discharge of the inflating gas G from the exhaust port 41 when a protrusion upward of the airbag 30 from the housing region 22 when operating is not restricted. This means that when the lap belt portion 13 is disposed on a lower portion side of the child seat 90 in such a way as to attach the child seat 90 to the seat 1, and a protrusion upward of the airbag 30 is restricted, the regulating valve mechanism 45 permits a discharge of the inflating gas G from the exhaust port 41. Because of this, the inflating gas G is discharged from the exhaust port 41 (refer to FIG. 14), and inflation of the airbag 30 is restricted. As a result of this, a pushing up of the child seat 90 by the airbag 30 is prevented, and a problem such as the child seat 90 being thrown around is prevented.

Consequently, the occupant protection device 10 of the embodiment is such that when a protrusion of the airbag 30 housed in the lap belt portion 13 is restricted, protrusion of the airbag 30 can be restricted by the inflating gas G being discharged. Further, when a protrusion of the airbag 30 is not restricted, the airbag 30 completes inflation smoothly, and can protect the occupant MP.

Further, the occupant protection device 10 of the embodiment is such that the regulating valve mechanism 45 is configured of the tubular valve body 46, which has flexibility, and the strap 50, which has flexibility. The valve body 46 is disposed on the peripheral edge of the exhaust port 41 on an inner peripheral face side of the airbag 30. The strap 50 is such that the valve body side end portion 51 on one end side is coupled to the leading end portion 46*b* side of the valve body 46 distanced from the base portion 46*a* on the peripheral edge of the exhaust port 41, and the peripheral wall side end portion 52 on the other end side is coupled to the peripheral wall 31 of the airbag 30. Further, the regulating valve mechanism 45 is such that when a tensile force of the peripheral wall 31 of the airbag 30 acts on the strap 50 when the airbag 30 inflates, the valve body 46 is pulled into the airbag 30 by the strap 50, and the peripheral wall (tubular body) 47 of the valve body 46, which receives the pressure of the inflating gas G, closes the exhaust port 41 in such a way that the inner peripheral faces 47*a* are brought into close contact with each other. Also, the regulating valve mechanism 45 is such that when the tensile force of the peripheral wall 31 of the airbag 30 does not act on the strap 50 when the airbag 30 inflates, the opened state of the exhaust port 41 is maintained, without the valve body 46 being pulled into the airbag 30.

Because of this, the embodiment is such that when the airbag 30 inflates without inflation being restricted, the peripheral wall 31 of the airbag 30 swells, and the peripheral wall side end portion 52 of the strap 50 of the regulating valve mechanism 45 is pulled, as shown in FIG. 10A and FIG. 11A to FIG. 10C and FIG. 11C. Further, the valve body 46 coupled to the valve body side end portion 51 of the strap 50 is pulled into the airbag 30, and the valve body 46 closes the exhaust port 41. Because of this, a discharge of the inflating gas C from the exhaust port 41 is restricted, and the airbag 30 completes inflation smoothly. Meanwhile, when the airbag 30 attempts to inflate in a restricted state, no tensile force acts on the strap 50, and at least one portion of the valve body 46 is in a state pushed to the outside of the airbag 30 from the exhaust port 41, as shown in FIG. 10A and FIG. 11A to FIG. 10B and FIG. 11B. Because of this, the valve body 46 does not close the exhaust port 41, the inflating gas C is discharged from the exhaust port 41, and inflation of the airbag 30 is restricted. That is, the regulating valve mechanism 45 is configured of two members, those being the tubular valve body 46, which is joined the peripheral edge of the exhaust port 41 and has flexibility, and the strap 50, which is coupled to the valve body 46 and the peripheral wall 31 of the airbag 30 and has flexibility, meaning that the regulating valve mechanism 45 can be configured simply.

In this case, in the embodiment, the valve body 46 is such that the multiple of vents 48 are opened penetrating the inner and outer peripheries in the peripheral wall in a vicinity of a region coupled to the strap 50.

Because of this, the embodiment is such that when inflation of the airbag 30 is restricted, that is, when the strap 50 swells and at least one portion of the valve body 46 is pushed to the outside of the airbag 30 from the exhaust port 41, the inflating gas G flows into the tubular region (tubular body) 47 of the valve body 46 extended from the peripheral edge of the exhaust port 41 (refer to FIG. 10B), then the inflating gas G that has flowed in is discharged smoothly to the outside of the airbag 30 via the multiple of vents 48. This means that provided that the valve body 46 includes the multiple of vents 48, restricting inflation of the airbag 30 can be carried out stably.

Further, the occupant protection device 10 of the embodiment is such that the exhaust port 41 is opened in one of the left and right side wall portions 35 (L and R) (in the embodiment, the right side wall portion 35R) of the airbag 30 when inflation is completed. Also, the direction in which the exhaust port 41 of the airbag 30 and the peripheral wall side end portion 52 of the strap 50 are disposed when inflation is completed is the left-right direction of the seat 1. Furthermore, the folded body 77 of the airbag 30 when housed in the housing region 22 is formed as follows. Firstly, the initial stage airbag 72 is formed. The initial stage airbag 72 is formed by, while flattening a vicinity of the inlet portion 37 that causes the inflating gas G to flow into the airbag 30, superimposing the peripheral wall region (rear wall portion) 33 of the airbag 30 above the vicinity of the inlet portion 37, and flattening. Furthermore, at this time, the initial stage airbag 72 is formed by disposing the strap 50 in the left-right direction, putting the base portion 46*a* side of the valve body 46 into a state pushed to the outside of the airbag 30 from the exhaust port 41, and putting the peripheral wall side end portion 52 of the strap 50 into a state placed inside the airbag 30 in such a way as to approach the valve body 46 side (refer to FIG. 8. Next, the end edge 75*a* and 75*b* sides in a direction perpendicular to the left-right direction of the initial stage airbag 72 are folded in such a way as to approach the inlet portion 37 side, and folded into a columnar body form whose axial center X is in the left-right direction, whereby the folded body 77 is formed (refer to FIGS. 9A, 9B, 9C, and 9D).

Because of this, the embodiment is such that when the airbag 30 inflates without a protrusion upward being restricted, the inflating gas G is caused to flow in from the inlet portion 37, and the airbag 30 inflates by eliminating the crease on the end edge 75*a* and 75*b* sides in the direction perpendicular to the left-right direction of the initial stage airbag 72, while pushing up the opposing region (the rear wall portion) 33 of the peripheral wall 31 of the airbag 30 in the vicinity of the inlet portion 37 of the initial stage airbag 72. However, when the airbag 30 inflates in a state wherein a protrusion upward is restricted, elimination of the crease on the end edge 75*a* and 75*b* sides in the direction perpendicular to the left-right direction of the initial stage airbag 72 is regulated. That is, the columnar body form of the folded body 77 of the airbag 30, wherein the axial center X is in the left-right direction, is such that swelling in a direction perpendicular to the axial center X is regulated, and the inflating gas G flowing in from the inlet portion 37 flows in the left-right direction along the axial center X. At this time, the initial stage airbag 72 is such that the strap 50 is disposed in the least-right direction in such a way as to follow the axial center X of the columnar body form of the folded body 77 of the airbag 30. Also, the base portion 46*a* side of the valve body 46 is in a state pushed to the outside of the airbag 30 from the exhaust port 41. Furthermore, the peripheral wall side end portion 52 of the strap 50 is in a state placed inside the airbag 30 in such a way as to approach the valve body 46 side. Further still, the position of the exhaust port 41 is in the right side wall portion 35R, which is one of the left and right side wall portions 35 (L and R) of the airbag 30, rather than in the upper side of the airbag 30, and is not positioned on a side wherein protrusion is restricted. This means that provided that a protrusion upward of the airbag 30 is regulated when the airbag 30 starts inflating, the peripheral wall 31 of the airbag 30 in the vicinity of the peripheral wall side end portion 52 of the strap 50 is unlikely to swell upward, and a state wherein tensile force does not act on the strap 50 exists. As a result of this, as shown in FIG. 10B and FIG. 11B, the state wherein the base portion 46*a* side of the valve body 46 is pushed out from the exhaust port 41 is maintained, the opened state of the exhaust port 41 is maintained, the inflating gas G is discharged from the exhaust port 41, and inflation of the airbag 30 is restricted. Of course, when a protrusion upward of the airbag 30 is not restricted, the airbag 30 is such that the inflating gas G is caused to flow in from the inlet portion 37, and the airbag 30 inflates by eliminating the crease on the end edge 75*a* and 75*b* sides in the direction perpendicular to the left-right direction of the initial stage airbag 72, while pushing up the opposing region (the rear wall portion) 33 of the peripheral wall 31 of the airbag 30 in the vicinity of the inlet portion 37 of the initial stage airbag 72. Because of this, as shown in FIG. 10C, and FIG. 11C, the peripheral wall 31 of the airbag 30 in the vicinity of the peripheral wall side end portion 52 of the strap 50 swells, and tensile force acts on the strap 50. As a result of this, the strap 50 pulls the valve body 46 into the airbag 30, the peripheral wall (tubular body) 47 of the valve body 46, which receives the pressure of the inflating gas G, closes the exhaust port 41, and the airbag 30 completes inflation smoothly. In addition, a discharge from the exhaust port 41 of the inflating gas G when inflation of the airbag 30 is restricted is a discharge from the exhaust port 41 opened in the one side (the right side wall portion) 35R of the left and right side wall portions of the airbag 30 when inflation is completed. That is, the discharge is a discharge from the exhaust port 41 disposed in one left-right side (the left side) of the lap belt portion 13 disposed in the left-right direction (refer to FIG. 14). This means that even when the rear face 93*a* of the frame 93 of the child seat 90 acting as an obstacle restricting inflation of the airbag 30 is disposed on a side above the folded body 77 disposed in the lap belt portion 13 (refer to FIGS. 13 and 14), the exhaust port 41 disposed on the right side among the left and right sides of the lap belt portion 13 is not blocked by the child seat 90 acting as an obstacle. Further, the exhaust port 41 can cause the inflating gas G to be discharged smoothly, as a result of which inflation of the airbag 30 is restricted smoothly.

Figure 15:
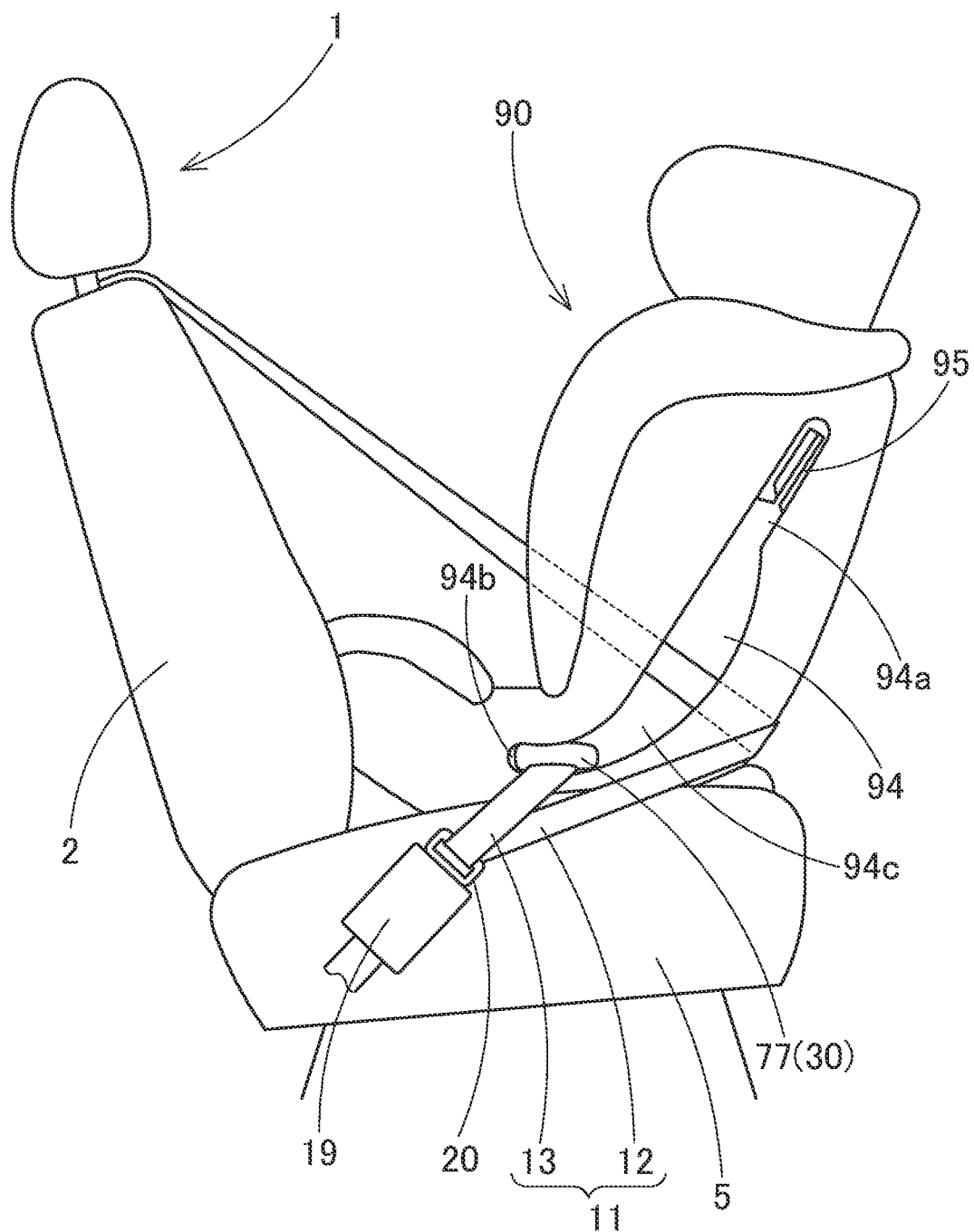
FIG. 15 is a schematic right side view of a state wherein the child seat is attached facing backward to the seat using the lap belt portion of the occupant protection device of the embodiment.

In the embodiment, the child seat 90 is fixed to the seat 1 facing forward. However, the child seat 90 may also be fixed to the seat 1 facing backward, as in a modification shown in FIG. 15.

Figure 16:
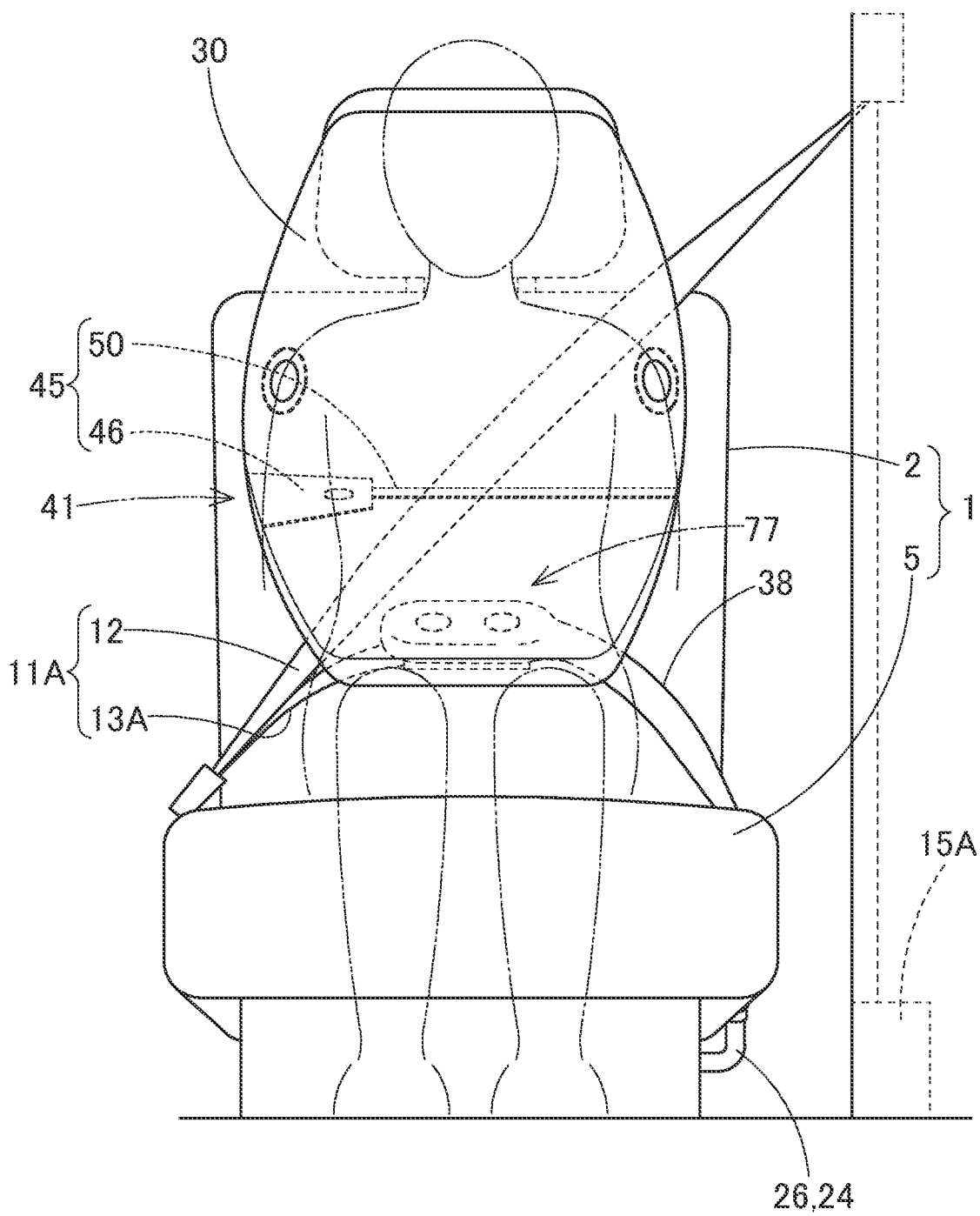
FIG. 16 is a drawing illustrating another aspect of a seat belt on which the occupant protection device of the embodiment is mounted.

Also, in the embodiment, the seat belt 11 wherein the retractor 15 is provided inside the seat 1 is shown as an example. However, a seat belt extending from a retractor 15A provided on a vehicle body side ma y be used as a seat belt 11A, as shown in FIG. 16. Further, the folded body 77 wherein the airbag 30 is folded up is housed in a region of a lap belt portion 13A of the seat belt 11A, and the conduit portion 38 extending from the inflator 24 is coupled to the airbag 30.

Furthermore, as a seat belt is not limited to the cases of three-point types shown in FIGS. 1 and 16, the folded body 77 wherein the airbag 30 is folded up may be housed in a lap belt portion of a two-point seat belt that has no shoulder belt portion. Of course, the conduit portion 38 extending from the inflator 24 is coupled to the airbag 30.

Further still, in the embodiment, a valve body such that the leading end portion 46*b* is closed, and the vent 48 is opened in a vicinity of the leading end portion 46*b*, is shown as the valve body 46 of the regulating valve mechanism 45. However, it is sufficient as a regulating valve mechanism formed of a valve body and a strap that when tensile force of a peripheral wall of an airbag acts on the strap when the airbag inflates, the valve body is pulled into the airbag by the strap, and a peripheral wall of the valve body, which has received pressure of an inflating gas, closes an exhaust port, and when tensile force of the peripheral wall of the airbag does not act on the strap, an opened state of the exhaust port is maintained, without the valve body being pulled into the airbag. Because of this, a valve body 46A may be configured simply of a tubular body 47A of which the leading end portion 46*b* is opened, as in a regulating valve mechanism 45A shown in FIGS. 17A, 17B and 17C. The valve body 46A is such that the base portion 46*a* side is joined to the peripheral edge of the exhaust port 41, and the leading end portion 46*b* side is a simple opened end of the tubular form. Further, the valve body 46A is such that one aperture (vent) 48A is opened on a terminal side of the leading end portion 46*b*, and a valve body side end portion 51A of a string-form strap 50A branched into a forked form is coupled to the leading end portion 46*b* side.

The regulating valve mechanism 45A is also such that when the airbag 30 inflates without the inflation being restricted, the peripheral wall 31 of the airbag 30 inflates, and the peripheral wall side end portion 52 of the strap 50A of the regulating valve mechanism 45A is pulled, as shown in FIG. 17A to FIG. 17C. Further, the valve body 46A coupled to the valve body side end portion 51A of the strap 50A is pulled into the airbag 30, the inner peripheral faces 47*a* of the tubular body 47A are brought into close contact with each other by the pressure of the inflating gas G, and the valve body 46A closes the exhaust port 41. Because of this, a discharge of the inflating gas G from the exhaust port 41 is restricted, and the airbag 30 completes inflation smoothly. Meanwhile, when the airbag 30 attempts to inflate in a restricted state, no tensile force acts on the strap 50A. Because of this, the valve body 46A is in a state pushed to the outside of the airbag 30 from the exhaust port 41, as shown in FIG. 17A to FIG. 17B. That is, the vent 46A formed of the opened end of the leading end portion 46*b* is disposed outside the airbag 30 in an opened state. Because of this, the inflating gas G is discharged to the outside of the airbag 30 from the exhaust port 41, while passing through the vent 48A, and inflation of the airbag 30 is restricted. As the strap 50A is of a string form, the inflating gas G when being discharged to the outside of the airbag 30 is discharged to the outside of the airbag 30 from the vent 48A through a gap in a periphery of the strap 50A. Further, the regulating valve mechanism 45A can also be configured of two members, those being the tubular valve body 46A, which is joined to the peripheral edge of the exhaust port 41 and has flexibility, and the strap 50A, which is coupled to the valve body 46A and the peripheral wall 31 of the airbag 30 and has flexibility, meaning that opening and closing of the exhaust port 41 can be carried out simply.

An occupant protection device of the embodiment is formed to include a lap belt portion disposed, in a state wherein left and right ends are coupled to a left and right of a seat, on a front side of a waist portion of an occupant seated in the seat, and an airbag that is housed folded up in a housing region of the lap belt portion and, when inflation is completed by an inflating gas being caused to flow in, has a lower face side as a supported face that is supported by a thigh portion of the occupant, and a rear face side as an occupant restraining face that receives an upper body of the occupant who moves forward. The airbag includes an exhaust port that can discharge the inflating gas flowing in, and a regulating valve mechanism that opens and closes the exhaust port. The regulating valve mechanism permits a discharge of the inflating gas from the exhaust port when a protrusion upward from the housing portion when the airbag inflates is restricted, and restricts a discharge of the inflating gas from the exhaust port when a protrusion upward from the housing portion when the airbag inflates is not restricted.

The occupant protection device of the embodiment is such that when operating, the inflating gas is caused to flow into the airbag housed in the housing region of the lap belt portion, and the airbag attempts to inflate. At this time, when a protrusion upward of the airbag from the housing region is restricted, the regulating valve mechanism permits a discharge of the inflating gas from the exhaust port, because of which the inflating gas is discharged from the exhaust port, and inflation of the airbag is restricted. This means that even when the lap belt portion is disposed on a lower side of a child seat in such a way as to attach the child seat to the seat, a pushing up of the child seat by the airbag can be prevented. Of course, when the lap belt portion is disposed on the front side of the waist portion of an occupant seated in the seat, without being used for attaching a child seat to the seat, a protrusion upward of the airbag from the housing region is not restricted. Because of this, the regulating valve mechanism restricts a discharge of the inflating gas from the exhaust port, and the inflating gas is not discharged from the exhaust port. As a result of this, the airbag completes inflation smoothly and, in a state wherein the lower face side supported face is supported by the thigh portion of the occupant, the upper body of the occupant who moves forward is received by the rear face side occupant restraining face, and can be protected.

Consequently, the occupant protection device of the embodiment is such that when a protrusion of the airbag housed in the lap belt portion is restricted, the inflating gas is discharged, and protrusion of the airbag can be restricted, and when a protrusion of the airbag is not restricted, the airbag completes inflation smoothly, and the occupant can be protected.

Further, the occupant protection device of the embodiment is such that the regulating valve mechanism is configured to include a tubular valve body having flexibility that is disposed in a peripheral edge of the exhaust port of the airbag, and a strap, which is a strap having flexibility including one end side and another end side, wherein the one end side is a valve body side end portion coupled to a leading end portion side of the valve body distanced from a base portion in the peripheral edge of the exhaust port, and the other end side is a peripheral wall side end portion coupled to a peripheral wall of the airbag via an interior of the airbag. Further, when a tensile force of the peripheral wall of the airbag is applied when the airbag inflates, the strap pulls the valve body into the airbag, and the exhaust port is closed by a peripheral wall of the valve body, which has received pressure of the inflating gas. Also, the strap is of a configuration such that when no tensile force of the peripheral wall of the airbag is applied, an opened state of the exhaust port is maintained, without the valve body being bulled into the airbag.

This kind of configuration is such that when the airbag inflates without inflation being restricted, the peripheral wall of the airbag swells, and the peripheral wall side end portion of the strap of the regulating valve mechanism is pulled. Further, the valve body coupled to the valve body side end portion of the strap is pulled into the airbag, and closes the exhaust port. Because of this, a discharge of the inflating gas from the exhaust port is restricted, and the airbag completes inflation smoothly. Meanwhile, when the airbag attempts to inflate in a restricted state, no tensile force acts on the strap. Therefore, at least one portion of the valve body is in a state pushed to the outside of the airbag from the exhaust port, the valve body does not close the exhaust port, and the inflating gas is discharged from the exhaust port. Because of this, inflation of the airbag is restricted. That is, this kind of occupant protection device is such that the regulating valve mechanism can be configured of two members, those being the tubular valve body, which is joined to the peripheral edge of the exhaust port and has flexibility, and the strap, which is coupled to the valve body and the peripheral wall of the airbag and has flexibility, meaning that the regulating valve mechanism can be configured simply.

In this case, the valve body is such that a multiple of vents may be provided penetrating inner and outer peripheries in the peripheral wall in a vicinity of a region coupled to the strap. This kind of configuration is such that when inflation of the airbag is restricted, that is, when the strap swells and at least one portion of the valve body is pushed to the outside of the airbag from the exhaust port, the inflating gas flows into a tubular region of the valve body extended from the peripheral edge of the exhaust port. Then, the inflating gas that has flowed in is discharged smoothly to the outside of the airbag via the multiple of vents of the valve body. Because of this, restricting inflation of the airbag can be carried out stably with this valve body.

Further, the occupant protection of the embodiment is such that the exhaust port is provided in one of left and right side wall portions of the airbag when inflation is completed. The direction in which the exhaust port of the airbag and the peripheral wall side end portion of the strap are disposed when inflation is completed is the left-right direction of the seat. A folded body of the airbag when housed in the housing region is formed by forming an initial stage airbag wherein, while flattening a vicinity of the inlet portion that causes the inflating gas to flow into the airbag, the peripheral wall region of the airbag is superimposed above the vicinity of the inlet portion, and flattened, then folding end edge sides in a direction perpendicular to the left-right direction of the initial stage airbag in such a way as to approach the inlet portion side, thereby folding into a columnar body form whose axial center is in the left-right direction. Also, the initial stage airbag is formed by disposing the strap in the left-right direction, putting the base portion side of the valve body into a state pushed to the outside of the airbag from the exhaust port, and putting the peripheral wall side end portion of the strap into a state placed inside the airbag in such a way as to approach the valve body side.

This kind of configuration is such that when the airbag inflates without a protrusion upward being restricted, the inflating gas is caused to flow in from the inlet portion, and the airbag inflates by eliminating a crease on the end edge sides in the direction perpendicular to the left-right direction of the initial stage airbag, while pushing up the opposing region of the peripheral wall of the airbag in the vicinity of the inlet portion of the initial stage airbag. However, when the airbag inflates in a state wherein a protrusion upward is restricted, elimination of the crease on the end edge sides in the direction perpendicular to the left-right direction of the initial stage airbag is regulated. Because of this, the columnar body form of the folded body of the airbag, wherein the axial center is in the left-right direction, is such that swelling in a direction perpendicular to the axial center is regulated. Further, the inflating gas flowing in from the inlet portion flows in the left-right direction along the axial center. At this time, the initial stage airbag is such that the strap is disposed in the left-right direction in such a way as to follow the axial center of the columnar body form of the folded body of the airbag, in addition to which the base portion side of the valve body is in a state pushed to the outside of the airbag from the exhaust port, and furthermore, the peripheral wall side end portion of the strap is in a state placed inside the airbag in such a way as to approach the valve body side. Furthermore, the position in which the exhaust port is disposed is in one of the left and right side wall portions of the airbag, rather than in the upper side of the airbag, and the exhaust port is not positioned on a side wherein protrusion is restricted. This means that provided that a protrusion upward of the airbag is regulated when the airbag starts inflating, the peripheral wall of the airbag in the vicinity of the peripheral wall side end portion of the strap is unlikely to swell outward, and a state wherein tensile force does not act on the strap exists. Because of this, the base portion side of the value body maintains, a state pushed to the outside from the exhaust port. As a result of this, the opened state of the exhaust port is maintained, the inflating gas is discharged from the exhaust port, and inflation of the airbag restricted. Of course, when a protrusion upward of the airbag is not restricted, the airbag is such that the inflating gas is caused to flow in from the inlet portion, and the airbag inflates by eliminating the crease on the end edge sides in the direction perpendicular to the left-right direction of the initial stage airbag, while pushing up the opposing region of the peripheral wall of the airbag in the vicinity of the inlet portion of the initial stage airbag. Further, the peripheral wall of the airbag in the vicinity of the peripheral wall side end portion of the strap swells, and tensile force acts on the strap. Because of this, the strap pulls the valve body into the airbag, and the peripheral wall of the valve body, which has received the pressure of the inflating gas, closes the exhaust port. Because of this, the airbag completes inflation smoothly. In addition, a discharge from the exhaust port of the inflating gas when inflation of the airbag is restricted is a discharge from the exhaust port opened in one side of the left and right side wall portions of the airbag when inflation is completed, that is, a discharge from the exhaust port disposed in one left-right side of the lap belt portion disposed in the left-right direction. This means that even when an obstacle restricting inflation of the airbag is disposed on a side above the folded body disposed is the lap belt portion, the exhaust port disposed on one of the left and right sides of the lap belt portion is not blocked by the obstacle, the inflating gas can be discharged smoothly, and inflation of the airbag can be restricted smoothly.

What is claimed is:

1. An occupant protection device, comprising:
    a lap belt portion configured and adapted so as to be disposed, in a state wherein left and right ends are coupled to a left and right of a seat, on a front side of a waist portion of an occupant seated in the seat; and
    an airbag that is housed folded up in a housing region of the lap belt portion and, when inflation is completed by an inflating gas being caused to flow in, has a lower face side as a supported face that is configured and adapted so as to be supported by a thigh portion of the occupant, and a rear face side as an occupant restraining face that is configured and adapted so as to receive an upper body of the occupant who moves forward, wherein
    the airbag includes
    an exhaust port that can discharge the inflating gas flowing in, and
    a regulating valve mechanism that opens and closes the exhaust port, and
    the regulating valve mechanism permits a discharge of the inflating gas from the exhaust port when a protrusion upward of the airbag from the housing portion when the airbag inflates is restricted, and
    restricts a discharge of the inflating gas from the exhaust port when the protrusion upward from the housing portion when the airbag inflates is not restricted.

2. The occupant protection device according to claim 1, wherein the regulating valve mechanism is configured to include
    a tubular valve body having flexibility that is disposed in a peripheral edge of the exhaust port of the airbag, and
    a strap, which is a strap having flexibility including one end side and another end side, wherein the one end side is a valve body side end portion coupled to a leading end portion side of the valve body distanced from a base portion in the peripheral edge of the exhaust port, and the other end side is a peripheral wall side end portion coupled to a peripheral wall of the airbag via an interior of the airbag, wherein,
    when a tensile force of the peripheral wall of the airbag is applied when the airbag inflates, the strap pulls the valve body into the airbag, and the exhaust port is closed by a peripheral wall of the valve body, which has received pressure of the inflating gas, and
    when no tensile force of the peripheral wall of the airbag is applied, the strap maintains an opened state of the exhaust port, without pulling the valve body into the airbag.

3. The occupant protection device according to claim 2, wherein
    the valve body includes a multiple of vents penetrating inner and outer peripheries in the peripheral wall in a vicinity of a region coupled to the strap.

4. The occupant protection device according to claim 2, wherein
    the exhaust port is provided in one of left and right side wall portions of the airbag when inflation is completed,
    a direction in which the exhaust port of the airbag and the peripheral wall side end portion of the strap are disposed when inflation is completed is a left-right direction of the seat,
    a folded body of the airbag when housed in the housing region is of a configuration formed by
    forming an initial stage airbag wherein, while flattening a vicinity of an inlet portion that causes the inflating gas to flow into the airbag, the peripheral wall region of the airbag is superimposed above the vicinity of the inlet portion, and flattened, then folding end edge sides in a direction perpendicular to a left-right direction of the initial stage airbag in such a way as to approach the inlet portion side, thereby folding into a columnar body form whose axial center is in the left-right direction, and the initial stage airbag is formed by disposing the strap in the left-right direction, putting the base portion side of the valve body into a state pushed to an outside of the airbag from the exhaust port, and putting the peripheral wall side end portion of the strap into a state placed inside the airbag in such a way as to approach the valve body side.

5. The occupant protection device according to claim 1, wherein the exhaust port is opened in one of left and right side wall portions of the airbag when inflation is completed.

6. The occupant protection device according to claim 2, wherein a folded body of the airbag is formed such that the base portion side of the valve body is disposed outside of the airbag by coming out of the exhaust port.

\* \* \* \* \*